(12) United States Patent
Mikesell et al.

(10) Patent No.: US 7,937,421 B2
(45) Date of Patent: May 3, 2011

(54) SYSTEMS AND METHODS FOR RESTRIPING FILES IN A DISTRIBUTED FILE SYSTEM

(75) Inventors: Paul A. Mikesell, Seattle, WA (US); Rob Anderson, Seattle, WA (US); Aaron James Passey, Seattle, WA (US); Peter John Godman, Seattle, WA (US); Hassan F. Khan, Seattle, WA (US); Darren P. Schack, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 487 days.

(21) Appl. No.: 10/714,326

(22) Filed: Nov. 14, 2003

(65) Prior Publication Data

US 2004/0153479 A1 Aug. 5, 2004

Related U.S. Application Data

(60) Provisional application No. 60/426,464, filed on Nov. 14, 2002.

(51) Int. Cl.
*G06F 12/00* (2006.01)
*G06F 17/30* (2006.01)
(52) U.S. Cl. ......... 707/825; 707/827; 711/114; 711/161
(58) Field of Classification Search .................. None
See application file for complete search history.

(56) References Cited

U.S. PATENT DOCUMENTS

| | | |
|---|---|---|
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,459,871 A | 10/1995 | Van Den Berg |
| 5,481,699 A | 1/1996 | Saether |
| 5,548,724 A | 8/1996 | Akizawa et al. |
| 5,548,795 A | 8/1996 | Au |
| 5,568,629 A | 10/1996 | Gentry et al. |
| 5,596,709 A | 1/1997 | Bond et al. |
| 5,606,669 A | 2/1997 | Bertin et al. |
| 5,612,865 A | 3/1997 | Dasgupta |

(Continued)

FOREIGN PATENT DOCUMENTS
EP 0774723 5/1997

(Continued)

OTHER PUBLICATIONS

International Search Report; PCT/US02/24728.

(Continued)

*Primary Examiner* — Usmaan Saeed
(74) *Attorney, Agent, or Firm* — Knobbe, Martens, Olson & Bear LLP

(57) ABSTRACT

Systems and methods for restriping files distributed among a set of smart storage units, wherein data blocks for a particular stripe do not typically need to be located at any particular location on the storage units, wherein data can be typically restriped among the smart storage units with minimal data movement, and wherein data is typically protected and recoverable even if a system failure occurs during the restriping process.

13 Claims, 21 Drawing Sheets

U.S. PATENT DOCUMENTS

| | | | |
|---|---|---|---|
| 5,649,200 A | 7/1997 | Leblang et al. | |
| 5,657,439 A | 8/1997 | Jones et al. | |
| 5,668,943 A | 9/1997 | Attanasio et al. | |
| 5,680,621 A | 10/1997 | Korenshtein | |
| 5,694,593 A | 12/1997 | Baclawski | |
| 5,696,895 A | 12/1997 | Hemphill et al. | |
| 5,734,826 A | 3/1998 | Olnowich et al. | |
| 5,754,756 A | 5/1998 | Watanabe et al. | |
| 5,761,659 A | 6/1998 | Bertoni | |
| 5,774,643 A | 6/1998 | Lubbers et al. | |
| 5,799,305 A | 8/1998 | Bortvedt et al. | |
| 5,805,578 A | 9/1998 | Stirpe et al. | |
| 5,805,900 A | 9/1998 | Fagen et al. | |
| 5,806,065 A | 9/1998 | Lomet | |
| 5,822,790 A | 10/1998 | Mehrotra | |
| 5,862,312 A | 1/1999 | Mann | |
| 5,870,563 A | 2/1999 | Roper et al. | |
| 5,878,410 A | 3/1999 | Zbikowski et al. | |
| 5,878,414 A | 3/1999 | Hsiao et al. | |
| 5,884,046 A | 3/1999 | Antonov | |
| 5,884,098 A | 3/1999 | Mason, Jr. | |
| 5,884,303 A | 3/1999 | Brown | |
| 5,890,147 A | 3/1999 | Peltonen et al. | |
| 5,917,998 A | 6/1999 | Cabrera et al. | |
| 5,933,834 A * | 8/1999 | Aichelen | 707/103 R |
| 5,943,690 A | 8/1999 | Dorricott et al. | |
| 5,966,707 A | 10/1999 | Van Huben et al. | |
| 5,996,089 A | 11/1999 | Mann | |
| 6,000,007 A | 12/1999 | Leung et al. | |
| 6,014,669 A | 1/2000 | Slaughter et al. | |
| 6,021,414 A | 2/2000 | Fuller | |
| 6,029,168 A * | 2/2000 | Frey | 707/10 |
| 6,038,570 A | 3/2000 | Hitz et al. | |
| 6,044,367 A | 3/2000 | Wolff | |
| 6,052,759 A | 4/2000 | Stallmo et al. | |
| 6,055,543 A | 4/2000 | Christensen et al. | |
| 6,055,564 A | 4/2000 | Phaal | |
| 6,070,172 A | 5/2000 | Lowe | |
| 6,081,833 A | 6/2000 | Okamoto et al. | |
| 6,081,883 A | 6/2000 | Popelka et al. | |
| 6,108,759 A | 8/2000 | Orcutt et al. | |
| 6,117,181 A | 9/2000 | Dearth et al. | |
| 6,122,754 A | 9/2000 | Litwin et al. | |
| 6,138,126 A | 10/2000 | Hitz et al. | |
| 6,154,854 A | 11/2000 | Stallmo | |
| 6,173,374 B1 | 1/2001 | Heil et al. | |
| 6,209,059 B1 | 3/2001 | Ofer et al. | |
| 6,219,693 B1 | 4/2001 | Napolitano et al. | |
| 6,279,007 B1 | 8/2001 | Uppala | |
| 6,321,345 B1 | 11/2001 | Mann | |
| 6,334,168 B1 | 12/2001 | Islam et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,393,483 B1 | 5/2002 | Latif et al. | |
| 6,397,311 B1 | 5/2002 | Capps | |
| 6,405,219 B2 | 6/2002 | Saether et al. | |
| 6,408,313 B1 | 6/2002 | Campbell et al. | |
| 6,415,259 B1 | 7/2002 | Wolfinger et al. | |
| 6,421,781 B1 | 7/2002 | Fox et al. | |
| 6,434,574 B1 | 8/2002 | Day et al. | |
| 6,449,730 B2 | 9/2002 | Mann | |
| 6,453,389 B1 | 9/2002 | Weinberger et al. | |
| 6,457,139 B1 | 9/2002 | D'Errico et al. | |
| 6,463,442 B1 | 10/2002 | Bent et al. | |
| 6,496,842 B1 | 12/2002 | Lyness | |
| 6,499,091 B1 | 12/2002 | Bergsten | |
| 6,502,172 B2 | 12/2002 | Chang | |
| 6,502,174 B1 | 12/2002 | Beardsley et al. | |
| 6,523,130 B1 | 2/2003 | Hickman et al. | |
| 6,526,478 B1 | 2/2003 | Kirby | |
| 6,546,443 B1 | 4/2003 | Kakivaya et al. | |
| 6,549,513 B1 | 4/2003 | Chao et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1 | 5/2003 | Larson | |
| 6,571,349 B1 | 5/2003 | Mann | |
| 6,574,745 B2 | 6/2003 | Mann | |
| 6,594,655 B2 | 7/2003 | Tal et al. | |
| 6,594,660 B1 | 7/2003 | Berkowitz et al. | |
| 6,594,744 B1 | 7/2003 | Humlicek et al. | |
| 6,598,174 B1 | 7/2003 | Parks et al. | |
| 6,618,798 B1 | 9/2003 | Burton et al. | |
| 6,631,411 B1 | 10/2003 | Welter et al. | |
| 6,658,554 B1 | 12/2003 | Moshovos et al. | |
| 6,662,184 B1 | 12/2003 | Friedberg | |
| 6,671,686 B2 | 12/2003 | Pardon et al. | |
| 6,671,704 B1 | 12/2003 | Gondi et al. | |
| 6,687,805 B1 | 2/2004 | Cochran | |
| 6,725,392 B1 * | 4/2004 | Frey et al. | 714/6 |
| 6,732,125 B1 | 5/2004 | Autrey et al. | |
| 6,742,020 B1 | 5/2004 | Dimitroff et al. | |
| 6,748,429 B1 | 6/2004 | Talluri et al. | |
| 6,801,949 B1 | 10/2004 | Bruck et al. | |
| 6,848,029 B2 | 1/2005 | Coldewey | |
| 6,856,591 B1 | 2/2005 | Ma et al. | |
| 6,871,295 B2 | 3/2005 | Ulrich et al. | |
| 6,895,482 B1 | 5/2005 | Blackmon et al. | |
| 6,895,534 B2 | 5/2005 | Wong et al. | |
| 6,907,011 B1 | 6/2005 | Miller et al. | |
| 6,907,520 B2 | 6/2005 | Parady | |
| 6,917,942 B1 | 7/2005 | Burns et al. | |
| 6,920,494 B2 | 7/2005 | Heitman et al. | |
| 6,922,696 B1 | 7/2005 | Lincoln et al. | |
| 6,934,878 B2 | 8/2005 | Massa et al. | |
| 6,940,966 B2 | 9/2005 | Lee | |
| 6,954,435 B2 | 10/2005 | Billhartz et al. | |
| 6,990,604 B2 | 1/2006 | Binger | |
| 6,990,611 B2 | 1/2006 | Busser | |
| 7,007,044 B1 | 2/2006 | Rafert et al. | |
| 7,007,097 B1 | 2/2006 | Huffman et al. | |
| 7,017,003 B2 | 3/2006 | Murotani et al. | |
| 7,043,485 B2 | 5/2006 | Manley et al. | |
| 7,043,567 B2 | 5/2006 | Trantham | |
| 7,069,320 B1 | 6/2006 | Chang et al. | |
| 7,103,597 B2 | 9/2006 | McGoveran | |
| 7,111,305 B2 | 9/2006 | Solter et al. | |
| 7,113,938 B2 | 9/2006 | Highleyman et al. | |
| 7,124,264 B2 | 10/2006 | Yamashita | |
| 7,146,524 B2 | 12/2006 | Patel et al. | |
| 7,152,182 B2 | 12/2006 | Ji et al. | |
| 7,177,295 B1 | 2/2007 | Sholander et al. | |
| 7,181,746 B2 | 2/2007 | Perycz et al. | |
| 7,184,421 B1 | 2/2007 | Liu et al. | |
| 7,194,487 B1 | 3/2007 | Kekre et al. | |
| 7,206,805 B1 | 4/2007 | McLaughlin, Jr. | |
| 7,225,204 B2 | 5/2007 | Manley et al. | |
| 7,228,299 B1 | 6/2007 | Harmer et al. | |
| 7,240,235 B2 | 7/2007 | Lewalski-Brechter | |
| 7,249,118 B2 | 7/2007 | Sandler et al. | |
| 7,257,257 B2 | 8/2007 | Anderson et al. | |
| 7,290,056 B1 | 10/2007 | McLaughlin, Jr. | |
| 7,313,614 B2 | 12/2007 | Considine et al. | |
| 7,318,134 B1 | 1/2008 | Oliveira et al. | |
| 7,346,720 B2 | 3/2008 | Fachan | |
| 7,370,064 B2 | 5/2008 | Yousefi'zadeh | |
| 7,373,426 B2 | 5/2008 | Jinmei et al. | |
| 7,386,675 B2 | 6/2008 | Fachan | |
| 7,386,697 B1 | 6/2008 | Case et al. | |
| 7,440,966 B2 | 10/2008 | Adkins et al. | |
| 7,451,341 B2 | 11/2008 | Okaki et al. | |
| 7,509,448 B2 | 3/2009 | Fachan et al. | |
| 7,509,524 B2 | 3/2009 | Patel et al. | |
| 7,533,298 B2 | 5/2009 | Smith et al. | |
| 7,546,354 B1 | 6/2009 | Fan et al. | |
| 7,546,412 B2 | 6/2009 | Ahmad et al. | |
| 7,551,572 B2 | 6/2009 | Passey et al. | |
| 7,558,910 B2 | 7/2009 | Alverson et al. | |
| 7,571,348 B2 | 8/2009 | Deguchi et al. | |
| 7,577,667 B2 | 8/2009 | Hinshaw et al. | |
| 7,590,652 B2 | 9/2009 | Passey et al. | |
| 7,593,938 B2 | 9/2009 | Lemar et al. | |
| 7,631,066 B1 | 12/2009 | Schatz et al. | |
| 7,676,691 B2 | 3/2010 | Fachan et al. | |
| 7,680,836 B2 | 3/2010 | Anderson et al. | |
| 7,680,842 B2 | 3/2010 | Anderson et al. | |

| Patent/Publication | Date | Name |
|---|---|---|
| 7,685,126 B2 | 3/2010 | Patel et al. |
| 7,739,288 B2 | 6/2010 | Lemar et al. |
| 7,743,033 B2 | 6/2010 | Patel et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,822,932 B2 | 10/2010 | Fachan et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0029200 A1 | 3/2002 | Dulin et al. |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 | 6/2002 | Cheng |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0124137 A1 | 9/2002 | Ulrich et al. |
| 2002/0138559 A1 | 9/2002 | Ulrich et al. |
| 2002/0156840 A1* | 10/2002 | Ulrich et al. ............ 709/203 |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1* | 11/2002 | Ulrich et al. ............ 707/10 |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 | 1/2003 | Giotta et al. |
| 2003/0014391 A1 | 1/2003 | Evans et al. |
| 2003/0033308 A1 | 2/2003 | Patel et al. |
| 2003/0061491 A1* | 3/2003 | Jaskiewicz et al. ........ 713/182 |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0135514 A1 | 7/2003 | Patel et al. |
| 2003/0149750 A1* | 8/2003 | Franzenburg ............ 709/220 |
| 2003/0158873 A1 | 8/2003 | Sawdon et al. |
| 2003/0161302 A1 | 8/2003 | Zimmermann et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182325 A1 | 9/2003 | Manley et al. |
| 2003/0233385 A1 | 12/2003 | Srinivasa et al. |
| 2004/0003053 A1 | 1/2004 | Williams |
| 2004/0024731 A1 | 2/2004 | Cabrera et al. |
| 2004/0024963 A1* | 2/2004 | Talagala et al. ............ 711/114 |
| 2004/0078812 A1 | 4/2004 | Calvert |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0158549 A1 | 8/2004 | Matena et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 | 12/2004 | Matthews et al. |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 | 2/2005 | Price |
| 2005/0044197 A1 | 2/2005 | Lai |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1 | 6/2005 | Jewell |
| 2005/0138195 A1 | 6/2005 | Bono |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047925 A1 | 3/2006 | Perry |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1* | 5/2006 | Godman et al. ............ 707/102 |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094452 A1 | 4/2007 | Fachan |
| 2007/0168351 A1 | 7/2007 | Fachan |
| 2007/0171919 A1 | 7/2007 | Godman et al. |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0255765 A1 | 11/2007 | Robinson |
| 2008/0005145 A1 | 1/2008 | Worrall |
| 2008/0010507 A1 | 1/2008 | Vingralek |
| 2008/0021907 A1* | 1/2008 | Patel et al. ............ 707/10 |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0126365 A1 | 5/2008 | Fachan et al. |
| 2008/0151724 A1 | 6/2008 | Anderson et al. |
| 2008/0154978 A1 | 6/2008 | Lemar et al. |
| 2008/0155191 A1 | 6/2008 | Anderson et al. |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Akidau et al. |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |

| | | | |
|---|---|---|---|
| 2009/0210880 | A1 | 8/2009 | Fachan et al. |
| 2009/0248756 | A1 | 10/2009 | Akidau et al. |
| 2009/0248765 | A1 | 10/2009 | Akidau et al. |
| 2009/0248975 | A1 | 10/2009 | Daud et al. |
| 2009/0249013 | A1 | 10/2009 | Daud et al. |
| 2009/0252066 | A1 | 10/2009 | Passey et al. |
| 2009/0327218 | A1 | 12/2009 | Passey et al. |
| 2010/0161556 | A1 | 6/2010 | Anderson et al. |
| 2010/0161557 | A1 | 6/2010 | Anderson et al. |
| 2010/0185592 | A1 | 7/2010 | Kryger |
| 2010/0223235 | A1 | 9/2010 | Fachan |
| 2010/0235413 | A1 | 9/2010 | Patel |
| 2010/0241632 | A1 | 9/2010 | Lemar et al. |

FOREIGN PATENT DOCUMENTS

| | | |
|---|---|---|
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 A2 | 3/2001 |
| WO | WO 01/33829 | 5/2001 |
| WO | WO 02/061737 A2 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

International Search Report for PCT/US03/36699.
International Search Report; PCT/US03/33704.
Sanjay Ghemawat et al., *The Google File System*, Symposium on Operating Systems Principles, Oct. 19-22, 2003, 15 pages, Bolton Landing, NY.
Philip A. Bernstein et al., *Concurrency Control and Recovery in Database Systems*, 1987, 370 pages, Addison-Wesley, Reading, Massachusetts.
Kenneth P. Birman, *Building Secure and Reliable Network Applications*, 1996, 591 pages, Manning Publications Co., Greenwich, Connecticut.
Jim Gray et al., *Transaction Processing: Concepts and Techniques*, 1993, 1070 pages, Morgan Kaufmann Publishers, San Mateo, California.
Nancy A. Lynch, *Distributed Algorithms*, 1996, 872 pages, Morgan Kaufmann Publishers, Inc., San Francisco, California.
Sape Mullender (editor), *Distributed Systems* (2nd ed.), 1993, 601 pages, ACM Press/Addison-Wesley Publishing Co., New York, NY.
Gerhard Weikum et al., *Transactional Information Systems: Theory, Algorithms, and the Practice of Concurrency Control and Recovery*, 2002, 853 pages, Morgan Kaufmann Publishers/Academic Press, San Francisco, California.
Duzett, Bob et al., *An Overview of the nCube 3 Supercomputer*, IEEE, Jul. 1992, pp. 458-464.
Hartman, John Henry, *The Zebra Striped Network File System*, (Sc.B. (Brown University) 1987, pp. 1-148.
Gibson, Garth A. et al., *The Scotch Parallel Storage System*, IEEE, 1995, pp. 403-410.
Long, Darrell D.E, et al., *Swift/RAID: A Distributed RAID System*, Computing Systems, vol. 7, No. 3 Summer 1994, pp. 333-359.
Michael Stonebraker et al., *Distributed Raid: A new Multiple copy Algorithm*, IEEE 1990, 24 pages, Berkeley, California.
United States Court of Appeals, Federal Circuit, *Seachange International, Inc. Vs. C-Cor, Inc.*, Jun. 29, 2005, 21 pages, United States District Court, Delaware.
United States District Court, *Seachange International, Inc. Vs. nCUBE, Corp.*, Apr. 7, 2004, 11 pages, United States District Court, Delaware.
United States District Court, *Seachange International, Inc. Vs. nCUBE, Corp.*, Aug. 29, 2000, 11 pages, United States District Court, Delaware.
Thomson/Westlaw, *Seachange International, Inc. Vs. nCUBE, Corp.*, Oct. 26, 2004, 28 pages, United States Court of Appeals, Delaware.
Pei Cao et al., The TickerTAIP parallel RAID architecture, 1993, 11 pages, Princeton, NJ.
Pei Cao et al., The TickerTAIP parallel RAID architecture, ACM Transactions on Computer Systems, vol. 12, No. 3, Aug. 1994, 33 pages, Palto Alto, California.
Apr. 11, 2005 Advisory Action fr U.S. Appl. No. 10/281,467, filed Oct. 25, 2002.
Mar. 17, 2004 response to Dec. 18, 2003 Office Action fr U.S. Appl. No. 10/007,003, filed Nov. 9, 2001.
Dec. 17, 2004 response to Aug. 17, 2004 Office Action fr U.S. Appl. No. 10/007,003, filed Nov. 9, 2001.
Jun. 24, 2005 response to Mar. 24, 2005 Office Action fr U.S. Appl. No. 10/007,003, filed Nov. 9, 2001.
Dec. 15, 2005 response to Sep. 15, 2005 Office Action fr U.S. Appl. No. 10/007,003, filed Nov. 9, 2001.
Apr. 6, 2006 response to Mar. 7, 2006 Office Action fr U.S. Appl. No. 10/007,003, filed Nov. 9, 2001.
Dec. 14, 2006 response to Jun. 14, 2006 Office Action fr U.S. Appl. No. 10/007,003, filed Nov. 9, 2001.
Jul. 19, 2007 response to Feb. 15, 2007 Office Action fr U.S. Appl. No. 10/007,003, filed Nov. 9, 2001.
Jun. 9, 2004 response to May 18, 2004 Office Action fr U.S. Appl. No. 10/281,467, filed Oct. 25, 2002.
Nov. 30, 2004 response to Aug. 30, 2004 Office Action fr U.S. Appl. No. 10/281,467, filed Oct. 25, 2002.
Mar. 28, 2005 response to Jan. 28, 2005 Office Action fr U.S. Appl. No. 10/281,467, filed Oct. 25, 2002.
Apr. 28, 2005 response to Apr. 11, 2005 Advisory Action fr U.S. Appl. No. 10/281,467, filed Oct. 25, 2002.
Dec. 13, 2005 response to Jun. 13, 2005 Office Action fr U.S. Appl. No. 10/281,467, filed Oct. 25, 2002.
Apr. 13, 2006 response to Feb. 14, 2006 Office Action fr U.S. Appl. No. 10/281,467, filed Oct. 25, 2002.
Steven M. Bauer, Letter to Steve Goldman, Jul. 31, 2006 (including the first pages of the patents).
Arthur S. Rose, Letter to Steven M. Bauer, Aug. 7, 2006.
Steven M. Bauer, Letter to Arthur S. Rose, Sep. 25, 2006.
Steven M. Bauer, Letter to Arthur S. Rose, Oct. 31, 2006.
Arthur S. Rose, Letter to Steven M. Bauer, Nov. 9, 2006.
Steven M. Bauer, Letter to Arthur S. Rose, Feb. 6, 2007.
Arthur S. Rose, Letter to Steven M. Bauer, Feb. 23, 2007.
Steven M. Bauer, Letter to Arthur S. Rose, Jun. 7, 2007 (including claim chart).
Arthur S. Rose, Letter to Steven M. Bauer, Jun. 22, 2007.
Todd A. Gerety, Letter to Arthur S. Rose, Jun. 26, 2007 (including exhibits listed separately).
Isilon Systems, "Isilon IQ Platform Overview", 1-4.
Isilon Systems, "Uncompromising Reliability through Clustered Storage", Sep. 2006, 1-10.
Byteandswitch, "Discovery Chooses Isilon," Apr. 23, 2007, 1.
Taneja Group Technology Analysts, "The Power of InfiniBand and Clustered Storage", Dec. 2005, 1-8.
Arthur S. Rose, Letter to Steven M. Bauer, Aug. 31, 2007.
Dec. 18, 2003 Office Action fr U.S. Appl. No. 10/007,003, filed Nov. 9, 2001.
Aug. 17, 2004 Office Action fr U.S. Appl. No. 10/007,003, filed Nov. 9, 2001.
Mar. 24, 2005 Office Action fr U.S. Appl. No. 10/007,003, filed Nov. 9, 2001.
Sep. 15, 2005 Office Action fr U.S. Appl. No. 10/007,003, filed Nov. 9, 2001.
Mar. 7, 2006 Office Action fr U.S. Appl. No. 10/007,003, filed Nov. 9, 2001.
Jun. 14, 2006 Office Action fr U.S. Appl. No. 10/007,003, filed Nov. 9, 2001.
Feb. 15, 2007 Office Action fr U.S. Appl. No. 10/007,003, filed Nov. 9, 2001.
May 18, 2004 Office Action fr U.S. Appl. No. 10/281,467, filed Oct. 25, 2002.
Aug. 30, 2004 Office Action fr U.S. Appl. No. 10/281,467, filed Oct. 25, 2002.
Jan. 28, 2005 Office Action fr U.S. Appl. No. 10/281,467, filed Oct. 25, 2002.

Jun. 13, 2005 Office Action fr U.S. Appl. No. 10/281,467, filed Oct. 25, 2002.

Feb. 14, 2006 Office Action fr U.S. Appl. No. 10/281,467, filed Oct. 25, 2002.

Aug. 9, 2007 Office Action fr U.S. Appl. No. 11/503,318, filed Aug. 11, 2006.

Jul. 19, 2006 Notice of Allowance fr U.S. Appl. No. 10/281, 467.

Feb. 22, 2008 International Search Report PCT/US07/018326.

Ramez Elmasri, Fundamentals of Database Systems 3rd ed, Sep. 30, 1999, Addison-Wesley, pp. 155,169,171,172,173,178,181,182,381,771.

May 8, 2008 Int'l Search report PCT/US07/018324, 13 pages.

MCSA/MSCE/MCDBA Self Paced Training Kit: MS SQL Server 2000 System Administration, May 14, 2003, Microsoft Press, Second Edition, 12 pages.

Supp EPO Search Report, App. No. EP 03 78 3599; dated Apr. 29, 2008, 2 pages.

Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.

Haerder T et al: "Principles of Transaction-Oriented Database Recovery" ACM Computing Surveys, ACM, New York, NY, US, vol. 15, No. 4, Dec. 1, 1983, pp. 287-317.

Gray J et al: "Transaction processing: concepts and techniques (excerpt), Passage" Transaction Processing: Concepts and Techniques, Jan. 1, 1993, pp. 373-445.

Garcia-Molina H et al: "Database System Implementation, passage" Database System Implementation, Jan. 1, 2000, pp. I-V, 423-509.

Wedde H. F., et al.: "A universal framework for managing metadata in the distributed Dragon Slayer System", Proceedings of the Euromicro Conference. Euromicro. Informatics: Inventing the Future, Proceedings of Euromicro Workshop onmultimedia and Telecommunications, vol. 2, Sep. 5, 2000, pp. 96-101.

Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.

Tanenbaum, Andrew S., Minix Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.

Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1-p. 447, last line.

Oct. 12, 2007 Non-Final Rejection in U.S. Appl. No. 10/007,003, filed Nov. 9, 2001.

Apr. 14, 2008 Response to Oct. 12, 2007 Non-Final Rejection in U.S. Appl. No. 10/007,003, filed Nov. 9, 2001.

Jul. 14, 2008 Restriction Requirement in U.S. Appl. No. 10/007,003, filed Nov. 9, 2001.

Aug. 14, 2008 Response to Jul. 14, 2008 Restriction Requirement in U.S. Appl. No. 10/007,003, filed Nov. 9, 2001.

Nov. 28, 2008 Final Rejection in U.S. Appl. No. 10/007,003, filed Nov. 9, 2001.

May 28, 2009 Response to Nov. 28, 2008 Final Rejection in U.S. Appl. No. 10/007,003, filed Nov. 9, 2001.

Aug. 11, 2009 Supplemental Response to Nov. 28, 2008 Final Rejection in U.S. Appl. No. 10/007,003, filed Nov. 9, 2001.

May 9, 2006 Examiner's Amendment in prosecution of U.S. Pat. No. 7,146,524 issued on Dec. 5, 2006.

Jul. 19, 2006 Supplemental Notice of Allowance in prosecution of U.S. Pat. No. 7,146,524 issued on Dec. 5, 2006.

Feb. 15, 2008 Response to Aug. 9, 2007 Non-Final Rejection in prosecution of U.S. Pat. No. 7,509,524 issued on Mar. 24, 2009.

May 9, 2008 Restriction Requirement in prosecution of U.S. Pat. No. 7,509,524 issued on Mar. 24, 2009.

Oct. 9, 2008 Response to May 9, 2008 Restriction Requirement in prosecution of U.S. Pat. No. 7,509,524 issued on Mar. 24, 2009.

Dec. 19, 2008 Notice of Allowance in prosecution of U.S. Pat. No. 7,509,524 issued on Mar. 24, 2009.

Aug. 17, 2009 Non-Final Rejection in U.S. Appl. No. 11/880,462 filed Jul. 19, 2007.

May 18, 2009 Int'l Search report PCT/US08/059798, 18 pages.

Lougher P. et al., "Scalable storage servers for digital audio and video," International Conference on Storage and Recording Systems, 1994, Keele, UK, Jan. 1, 1994, pp. 140-143.

Reddy, P. Krishna et al., Reducing the blocking in two phase commit with backup sites Apr. 15, 2003, Elsevier, pp. 39-47.

IOS Commands, Feb. 6, 2005, Pantz.org, [online], <web.archive.org/web/20050206184604/http://pantz.org/os/ios/ioscommands.shtml>, pp. 1-12 as printed.

IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.

Oct. 16, 2009 Notice of Allowance in U.S. Appl. No. 10/007,003, filed Nov. 9, 2001.

Mar. 18, 2010 Notice of Allowance in U.S. Appl. No. 11/880,462, filed Jul. 19, 2007.

Oct. 8, 2008 European Supplemental Search Report EP 02 75 6944, 6 pages.

Jan. 23, 2009 Examination Report EP 02 75 6944, 5 pages.

Oct. 22, 2009 Int'l Preliminary Report on Patentability PCT/US08/059798, 10 pages.

Keidar, et al.: Increasing the Resilience of Distributed and Replicated Database Systems (1998) pp. 1-25.

Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.

Yoshitake Shinkai, Cluster File System: HAMFS, Fujitsu, Japan, Fujitsu Limited, Jul. 9, 1999, vol. 50, No. 4, pp. 210 to 214 (stamped Citation 2 / English Translation attached) total 16 pages.

Duchamp, Dan: "Analysis of Transaction Management Performance", ACM Symposium on Operating Systems Principles, pp. 177-190, Dec. 1989.

Silaghi, Raul et al.: "Porting OMTTs to CORBA", Lecture Notes in Computer Science, vol. 2888/2003, pp. 1521-1542, Nov. 2003.

Dorai et al.:, "Transport Threads: Resource Sharing in SMT Processor for High Single-Thread Performance", proceedings of the 2002 International Conference on Parallel Architectures and Complication Techniques, Sep. 2002, 12 pages.

Peterson, Zachary Nathaniel Joseph, "Data Placement for Copy-On-Write Using Virtual Contiguity," Master of Science in Computer Science Thesis, University of California, Santa Cruz, Sep. 2002, 67 pages.

Sep. 29, 2010 Office Action in U.S. Appl. No. 12/135,979, filed Jun. 9, 2008.

Coulouris et al., "*Distributed Systems Concepts and Design*"; Addison-Wesley, Second Edition, 1994, pp. 353-371 and 377-405.

Stallings, William; "*Operating Systems*", Prentice Hall, Fourth Edition, 2001, pp. 197-253 and 265-293.

Birk, Y., *Deterministic load-balancing schemes for disk-based video-on-demand storage servers*, Mass Storage Systems 1995, Storage—At the Forefront of Information Infrastructures', Proceedings of the Fourteenth IEEE Symposium on Monterey, CA, Sep. 11-14, 1995, pp. 17-25.

European Search Report dated May 21, 2007 issued to EP application No. 02756944.1-2201.

* cited by examiner

| TYPE 0 | | |
|---|---|---|
| | DEVICE | BLOCK |
| 0 | | | D0
| 1 | | | D1
| 2 | | | D2
| 3 | | | D3
| 4 | | | D4
| 5 | | | D5
| 6 | | | D6
| 7 | | | D7
| 8 | | | D8
| 9 | | | D9
| 10 | | | D10
| 11 | | | D11
| 12 | | | D12
| 13 | | | D13
| 14 | | | D14
| 15 | | | D15
| 16 | | | D16
| 17 | | | D17
| 18 | | | D18
| 19 | | | D19
| 20 | | | D20
| 21 | | | D21
| 22 | | | D22
| 23 | | | D23

*FIG. 6A*

| TYPE 1 | | |
|---|---|---|
| | DEVICE | BLOCK |
| 0 | | | D0
| 1 | | | D1
| 2 | | | D2
| 3 | | | D3
| 4 | | | D4
| 5 | | | D5
| 6 | | | D6
| 7 | | | D7
| 8 | | | D8
| 9 | | | D9
| 10 | | | D10
| 11 | | | D11
| 12 | | | D12
| 13 | | | D13
| 14 | | | D14
| 15 | | | SI0
| 16 | | | DI0
| 17 | | | TI0
| 18 | | | SI1
| 19 | | | DI1
| 20 | | | TI1
| 21 | | | SI2
| 22 | | | DI2
| 23 | | | TI2

*FIG. 6B*

| TYPE 2 | | |
|---|---|---|
| | DEVICE | BLOCK |
| 0 | | | SI0
| 1 | | | DI0
| 2 | | | TI0
| 3 | | | SI1
| 4 | | | DI1
| 5 | | | TI1
| 6 | | | SI2
| 7 | | | DI2
| 8 | | | TI2
| 9 | | | SI3
| 10 | | | DI3
| 11 | | | TI3
| 12 | | | SI4
| 13 | | | DI4
| 14 | | | TI4
| 15 | | | SI5
| 16 | | | DI5
| 17 | | | TI5
| 18 | | | SI6
| 19 | | | DI6
| 20 | | | TI6
| 21 | | | SI7
| 22 | | | DI7
| 23 | | | TI7

FIG. 6C

| TYPE 3 | | |
|---|---|---|
| | DEVICE | BLOCK |
| 0 | | | TI0
| 1 | | | TI1
| 2 | | | TI2
| 3 | | | TI3
| 4 | | | TI4
| 5 | | | TI5
| 6 | | | TI6
| 7 | | | TI7
| 8 | | | TI8
| 9 | | | TI9
| 10 | | | TI10
| 11 | | | TI11
| 12 | | | TI12
| 13 | | | TI13
| 14 | | | TI14
| 15 | | | TI15
| 16 | | | TI16
| 17 | | | TI17
| 18 | | | TI18
| 19 | | | TI19
| 20 | | | TI20
| 21 | | | TI21
| 22 | | | TI22
| 23 | | | TI23

FIG. 6D

| MODE | DIRECTORY |
|---|---|
| OWNER | ROOT |
| TIMESTAMP | 65536 |
| SIZE | 345 |
| PARITY COUNT | 0 |
| MIRROR COUNT | 3 |
| VERSION | 1 |
| TYPE | 1 |
| DEVICE 1 | BLOCK 11 |
| DEVICE 2 | BLOCK 21 |
| DEVICE 3 | BLOCK 31 |
| REFERENCE COUNT | 1 |
| FLAGS | 777 |
| PARITY MAP POINTER | NULL |

*FIG. 7A*

| | DEVICE | BLOCK |
|---|---|---|
| 0 | 11 | 001 |
| 1 | 12 | 001 |
| 2 | 13 | 001 |
| 3 | 14 | 001 |
| 4 | 15 | 001 |
| 5 | 11 | 011 |
| 6 | 12 | 011 |
| 7 | 13 | 011 |
| 8 | 14 | 011 |
| 9 | 15 | 011 |
| 10 | 11 | 021 |
| 11 | 12 | 021 |
| ... | ... | ... |

| | DEVICE | BLOCK |
|---|---|---|
| 0 | 6 | 897 |
| 1 | 7 | 003 |
| 2 | 8 | 321 |
| 3 | 9 | 452 |
| 4 | 10 | 721 |
| 5 | 6 | 651 |
| 6 | 7 | 981 |
| 7 | 8 | 133 |
| 8 | 9 | 727 |
| 9 | 10 | 563 |
| 10 | 6 | 229 |
| 11 | 7 | 583 |
| ... | ... | ... |

810

| | DEVICE | BLOCK |
|---|---|---|
| 0 | 1 | 375 |
| 1 | 2 | 223 |
| 2 | 3 | 532 |
| 3 | 4 | 791 |
| 4 | 5 | 101 |
| 5 | 1 | 376 |
| 6 | 2 | 224 |
| 7 | 3 | 533 |
| 8 | 4 | 792 |
| 9 | 5 | 102 |
| 10 | 1 | 377 |
| 11 | 2 | 225 |
| ... | ... | ... |

*FIG. 8B*

|   | DEVICE | BLOCK |
|---|---|---|
| 0 | 5 | 100 |
| 1 | 9 | 200 |
| 2 | 7 | 306 |
| 3 | 5 | 103 |
| 4 | 9 | 203 |
| 5 | 7 | 303 |
| 6 | 5 | 106 |
| 7 | 9 | 206 |
| 8 | 7 | 306 |
| 9 | 5 | 109 |

810

| 18 | 5 | 118 |
|---|---|---|
| 19 | 9 | 218 |
| 20 | 7 | 318 |

| P | | |
|---|---|---|

|   | DEVICE | BLOCK |
|---|---|---|
| 0 | 6 | 001 |
| 1 | 8 | 001 |
| 2 | 10 | 001 |
| 3 | 6 | 002 |
| 4 | 8 | 002 |
| 5 | 10 | 002 |
| 6 | 6 | 003 |

*FIG. 8C*

SYSTEMS AND METHODS FOR RESTRIPING FILES IN A DISTRIBUTED FILE SYSTEM

This application claims the benefit of U.S. Provisional Application No. 60/426,464 filed Nov. 14, 2002, which is hereby incorporated by reference in its entirety.

FIELD OF THE INVENTION

The systems and methods of the present invention relate generally to the field of distributed file storage, and in particular to restriping files stored in an intelligent distributed file management system.

BACKGROUND

The explosive growth of the Internet has ushered in a new area in which information is exchanged and accessed on a constant basis. In response to this growth, there has been an increase in the size of data that is being shared. Users are demanding more than standard HTML documents, wanting access to a variety of data, such as, audio data, video data, image data, and programming data. Thus, there is a need for data storage that can accommodate large sets of data, while at the same time provide fast and reliable access to the data.

One response has been to utilize single storage devices which may store large quantities of data but have difficulties providing high throughput rates. As data capacity increases, the amount of time it takes to access the data increases as well. Processing speed and power has improved, but disk I/O (Input/Output) operation performance has not improved at the same rate making I/O operations inefficient, especially for large data files.

Another response has been to allow multiple servers access to shared disks using architectures, such as, Storage Area Network solutions (SANs), but such systems are expensive and require complex technology to set up and to control data integrity. Further, high speed adapters are required to handle large volumes of data requests.

One problem with conventional approaches is that they are limited in their scalability. Thus, as the volume of data increases, the systems need to grow, but expansion is expensive and highly disruptive.

Another common problem with conventional approaches is that they are limited in their flexibility. The systems are often configured to use predefined error correction control. For example, a RAID system may be used to provide redundancy and mirroring of data files at the physical disk level giving administrators little or no flexibility in determining where the data should be stored or the type of redundancy parameters that should be used.

SUMMARY

The intelligent distributed file system advantageously enables the storing of file data among a set of smart storage units that are accessed as a single file system. The intelligent distributed file system advantageously utilizes a metadata data structure to track and manage detailed information about each file, including, for example, the device and block locations of the file's data blocks, to permit different levels of replication and/or redundancy within a single file system, to facilitate the change of redundancy parameters, to provide high-level protection for metadata, to replicate and move data in real-time, and so forth.

The intelligent distributed file system may also advantageously include systems and methods for restriping files distributed among a set of smart storage units, wherein data blocks for a particular stripe do not typically need to be located at any particular location on the storage units, wherein data may be restriped among the smart storage units with minimal data movement, and wherein data is typically protected and recoverable even if a system failure occurs during the restriping process.

One aspect of the present invention relates to a distributed file system communicating with a plurality of intelligent storage devices, wherein the distributed file system comprises a messaging system and is configured to store and manage metadata about files and directories stored on the distributed file system such that the metadata includes locations of metadata data blocks, content data blocks, and parity data blocks, and the distributed file system is further configured to restripe data files.

Another aspect of the present invention relates to a method of restriping data stored in a plurality of smart storage devices in an intelligent distributed file system. The method comprises identifying at least one smart storage device on which clusters of data from an existing file may be stored; storing the clusters on the identified smart storage device; determining that the clusters were successfully stored; and updating metadata related to the clusters of data to reflect new assignments.

An additional aspect of the present invention relates to a system for restriping data. The system comprises a plurality of smart devices, the smart devices configured to store data blocks in stripes distributed among the smart devices; an assignment module configured to assign data blocks to smart devices; a request module configured to send instructions to the smart devices to store the data blocks after the data blocks are assigned; and an update module configured to update metadata related to the data blocks after the data blocks are stored.

Another aspect of the present invention relates to a method of restriping a data comprised of data blocks. The method comprises assigning a data block to storage unit; determining if the data block is already stored on the storage unit; storing the data block on the storage unit if it is not already residing on the storage unit; and updating metadata related to the data block if the data block has been stored.

An additional aspect of the present invention relates to a method of assigning data blocks to storage units. The method comprises identifying available storage units; selecting an available storage unit for each data block; and determining related address locations for each selected storage unit.

Another aspect of the present invention relates to a method of selecting a storage unit from a set of storage units for storing a block of data in a protection group. The method comprises identifying which storage unit from the set of storage units is the optimal storage unit in relation to the protection group; and selecting the optimal storage unit.

An additional aspect of the present invention relates to a method of selecting a storage unit for a block of data. The method comprises identifying storage units on which the block of data is currently stored; identifying an optimal location on a first storage unit; determining a set of optimal storage units; if the first storage unit is one of the storage units on which the block of data is currently stored, selecting the first storage unit; and if the first storage unit is not one of the storage units on which the block of data is currently stored, selecting one of the set of optimal storage units.

Another aspect of the present invention relates to a system having a storage device containing instructions that, when executed, cause the system to perform the method of identifying storage devices on which clusters of data from existing files will be stored; storing the clusters on the identified storage devices; determining that the clusters were successfully stored; and updating metadata related to the clusters of data.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 6A illustrates one embodiment of a data location table structure.

FIG. 6B illustrates an additional embodiment of a data location table structure.

FIG. 6C illustrates an additional embodiment of a data location table structure.

FIG. 6D illustrates an additional embodiment of a data location table structure.

FIG. 7A illustrates one embodiment of a metadata data structure for a directory.

FIG. 8B illustrates an additional embodiment of a data location table.

FIG. 8C illustrates an additional embodiment of a data location table.

DETAILED DESCRIPTION OF PREFERRED EMBODIMENTS

Figure 1:
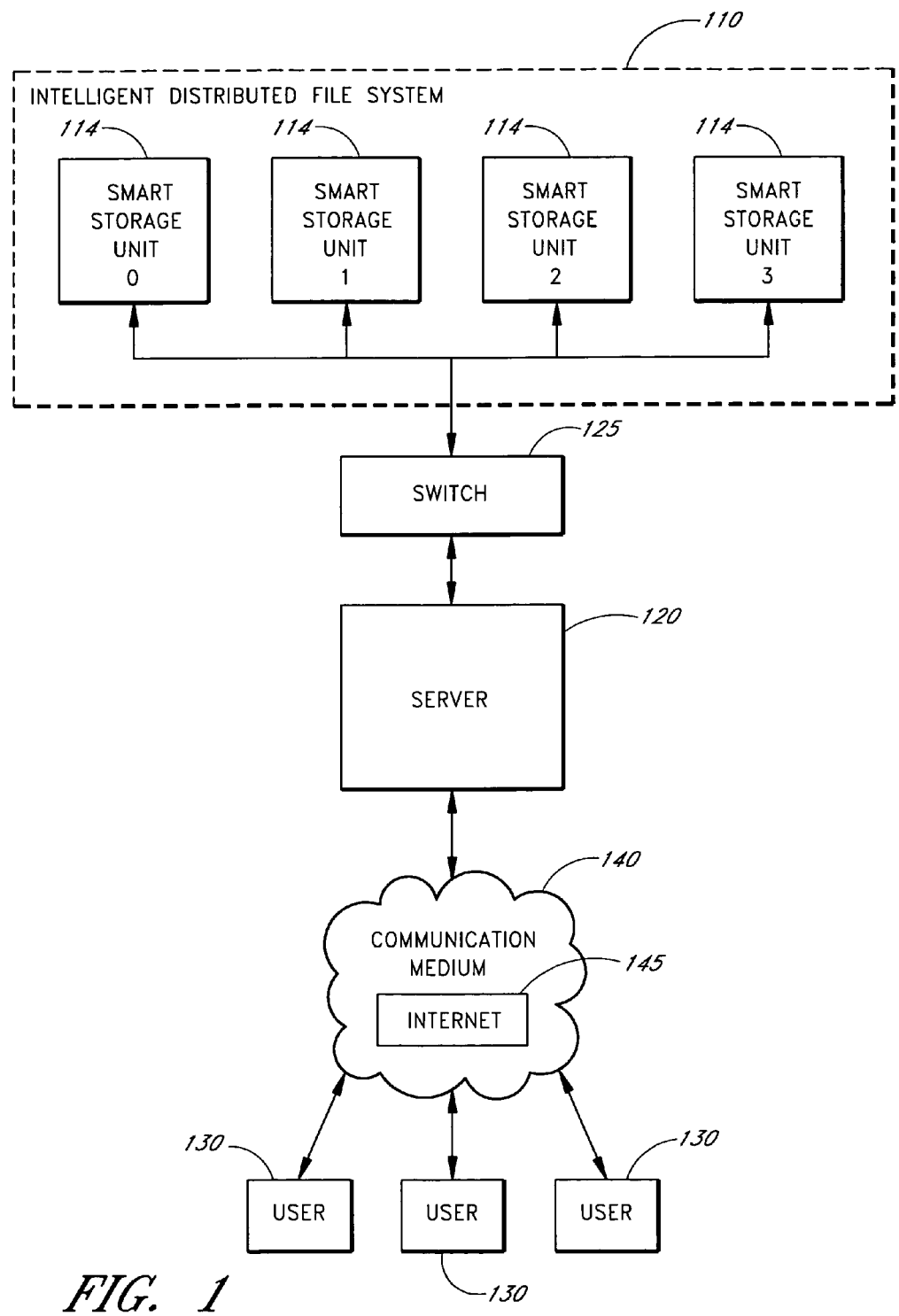
FIG. 1 illustrates a high-level block diagram of one embodiment of the present invention.

Systems and methods which represent various embodiments and example applications of the invention will now be described with reference to the drawings. Variations to the systems and methods which represent other embodiments will also be described.

For purposes of illustration, some embodiments will be described in the context of Internet content-delivery and web hosting. The inventors contemplate that the present invention is not limited by the type of environment in which the systems and methods are used, and that the systems and methods may be used in other environments, such as, for example, the Internet, the World Wide Web, a private network for a hospital, a broadcast network for a government agency, an internal network of a corporate enterprise, an intranet, a local area network, a wide area network, and so forth. The figures and descriptions, however, relate to an embodiment of the invention wherein the environment is that of Internet content-delivery and web hosting. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates the figure in which the element first appears.

I. Overview

The systems and methods of the present invention provide an intelligent distributed file system, which enables the storing of data among a set of smart storage units that are accessed as a single file system. The intelligent distributed file system tracks and manages detailed metadata about each file. Metadata may include any data that relates to and/or describes the file, such as, for example, the location of the file's data blocks, including both device and block location information, the location of redundant copies of the metadata and/or the data blocks (if any), error correction information, access information, the file's name, the file's size, the file's type, the smart storage units on which the file's data and protection information is stored, and so forth. In addition, the intelligent distributed file system permits different levels of replication and/or redundancy for different files and/or data blocks which are managed by the file system, facilitates the changing of redundancy parameters while the system is active, facilitates the recovery of missing data while the system is active, and enables the real-time replication and movement of metadata and data. Further, each smart storage unit may respond to a file request by locating and collecting the file's data from the set of smart storage units.

The intelligent distributed file system advantageously provides access to data in situations where there are a large number of READ requests especially in proportion to the number of WRITE requests. This is due to the added complexities of locking a group of smart storage units, or journaling on the smart storage units to ensure consistency for WRITE requests. Furthermore, the intelligent distributed file system advantageously handles block transactions wherein requests for large blocks of data are common.

One benefit of some embodiments is that the metadata for files and directories is managed and accessed by the intelligent distributed file system. The metadata may indicate where the metadata for a directory or file is located, where content data is stored, where mirrored copies of the metadata and/or content data are stored, as well as where parity or other error correction information related to the system is stored. Data location information may be stored using, for example, device and block location information. Thus, the intelligent distributed file system may locate and retrieve requested content data using metadata both of which may be distributed and stored among a set of smart storage units. In addition, because the intelligent distributed file system has access to the metadata, the intelligent distributed file system may be used to select where data should be stored and to move, replicate, recover, and/or change data without disrupting the set of smart storage units.

Another benefit of some embodiments is that data for each file may be stored across several smart storage units and accessed in a timely manner. Data blocks for each file may be distributed among a subset of the smart storage units such that data access time is reduced. Further, different files may be distributed across a different number of smart storage units as well as across different sets of smart storage units. This architecture enables the intelligent distributed file system to store data blocks intelligently based on factors, such as, the file's size, importance, anticipated access rate, as well as the available storage capacity, CPU utilization, and network utilization of each smart storage unit.

An additional benefit of some embodiments is that the systems and methods may be used to provide various protection schemes, such as, error correction, redundancy, and mirroring, on a block or file basis such that different blocks or files stored among the smart storage units may have different types of protection. For example, some directories or files may be mirrored, others may be protected with error and/or loss correction data using a variety of error or loss correction schemes, and others of lower importance may not use any protection schemes.

A further benefit of some embodiments is that the systems and methods may enable the real-time addition, deletion, and/or modification of smart storage units without disrupting or interrupting ongoing data requests. Thus, as more storage is required, additional smart storage units may be added to the set of smart storage units and incorporated into the intelligent distributed file system in real-time without interrupting the file requests or having to take the existing smart storage units offline. The existing smart storage units may process requests for files as the data blocks of existing files or new files are being distributed by the intelligent distributed file system across the set of smart storage units which now includes the new smart storage units.

Another benefit of some embodiments is that the systems and methods may perform real-time modifications to the storage of the data blocks by replicating those blocks on one or more of the smart storage units, and thus creating multiple points of access for any individual data block. This replication helps to reduce the utilization of CPU and network resource requirements for individual smart storage units for a file or group of files for which frequent access patterns have been observed. These access patterns are monitored by the smart storage units, and the intelligent distributed file system affords the smart storage units the flexibility to make such data replications while the intelligent distributed file system is still operating.

A further benefit of some embodiments is that the systems and methods permit real-time relocation of data files through the restriping of the files over one or more smart storage units. This restriping may, in some embodiments, be advantageously performed with a minimal amount of data block movement preserving the integrity of data and ensuring recoverability even if a system failure occurs during the restriping process. This restriping system advantageously does not require particular data blocks to be located at any particular location on the smart storage units, continues to provide protection for the stored data blocks, and allows for data recoverability even if one or more of the smart storage units fails.

II. Sample Operation

For purposes of illustration, a sample scenario will now be discussed in which the intelligent distributed file system is used in operation. In this sample scenario, the intelligent distributed file system is used by a company that offers movie downloads via an Internet web site. The company may use the intelligent distributed file system to store and manage copies of downloadable movies as well as movie trailers, advertisements, and customer information that are accessed by customers via the web site. The data may be stored with various levels of protection and stored across multiple smart storage units for fast access.

For example, the company may want to store customer survey emails across several smart storage units in the intelligent distributed file system to provide fast access to the emails. The company may, however, keep backup tapes of all emails and may feel that it is not vital to enable immediate recovery of customer surveys. The company may instruct the intelligent distributed file system not to use error correction or mirroring protection on the customer survey emails. Thus, if one or more of the smart storage units become inaccessible, the company may feel it is acceptable that access to the customer survey emails on those smart storage units is delayed until the emails can be restored from the backup tapes.

For advertisements, the company may instruct the intelligent distributed file system to use high error correction parameters such that if one or more smart storage units fail, the intelligent distributed file system can recover the data without interrupting the display of the advertisement. For example, the company may rely upon various fault tolerance measurements to assist in determining how much protection should be given to a particular file. For important information, the company may want to ensure a fault tolerance level of X, and for less important information, the company want to ensure a fault tolerance level of Y where X>Y. Thus, the company may ensure its advertisers that the advertisements will be available on a reliable basis even if one or more of the smart storage units fail. It is recognized that other measurements, in addition to or instead of fault tolerance may be used, and that fault tolerance is used to illustrate one measurement of reliability.

For the top movie downloads, the company may advantageously set up the intelligent distributed file system to automatically store multiple copies of the movie data to enable more customers access to the data and to ensure that if one or more of the smart storage units fail, then the missing data may be regenerated or retrieved from other locations. Moreover, additional copies of the top movie downloads may be created and stored among the smart storage units if the number of requests increases and/or if one or more of the smart storage units begins to become flooded with requests for the data that resides on the smart storage unit.

The company may choose to offer other movies that are not as popular and may instruct the intelligent distributed file system to store fewer copies due to the lower demand. Further, as the "top download movies" become less popular, the company may advantageously set up the intelligent distributed file system to delete extra copies of the movies from the smart storage units on which the movies are stored and move the "less popular" movies to smart storage units with slower performance (e.g., those smart storage units with less available disk space). The intelligent distributed file system may be set to automatically take care of these tasks using the smart storage units.

In addition, as the company acquires more movies, the company may add additional smart storage units to the intelligent distributed file system. The company may then use the new smart storage units to store more movies, to store more copies of existing movies, to redistribute existing movie data to improve response time, and/or change the protection scheme of one or more files. The additional smart storage units are incorporated into the intelligent distributed file system such that the intelligent distributed file system appears as a single file system even though the intelligent distributed file system manages and stores data among a set of multiple smart storage units.

If one of the smart storage units falls, the intelligent distributed file system may reconstruct any file data that was stored on the failed unit, store the information on working units, and update the appropriate metadata data structures. Thus, if the user requests a file that is partially stored on the failed unit, the user may still receive the file's data without knowing that one of the units is down.

In this example, the intelligent distributed file system provides the company the ability to offer reliable and fast access to top movie downloads, fast access to less popular movies, and access to customer survey emails. For each file, the company may set error and/or loss correction parameters and may select how many additional copies of the file should be stored. In some situations, the company may manually choose how many copies of data should be stored and determine where to store the data. In other situations, the company may rely on the features of the intelligent distributed file system to select how many copies of data should be stored, the error and/or loss correction scheme that should be used (if any), and/or where the data should be stored. Thus, the company is able to efficiently use its storage space to better respond to user requests. Storage space is not wasted on sparsely requested files, and error correction information is not generated and stored for unimportant files.

While the example above involves a company that offers movies for downloading, it is recognized that this example is used only to illustrate features of one embodiment of an intelligent distributed file system. Further, the intelligent distributed file system may be used in other environments and may be used with other types of and/or combinations of data, including, for example, sound files, audio files, graphic files, multimedia files, digital photographs, executable files, and so forth.

III. Intelligent Distributed File System

FIG. 1 illustrates one embodiment of an intelligent distributed file system 110 which communicates with a network server 120 to provide remote file access. The intelligent distributed file system 110 may communicate with the network server 120 using a variety of protocols, such as, for example, NFS or CIFS. Users 130 interact with the network server 120 via a communication medium 140, such as the Internet 145, to request files managed by the intelligent distributed file system 110. The exemplary intelligent distributed file system 110 makes use of a switch component 125 that communicates with a set of smart storage units 114 and the network server 120. The intelligent distributed file system 110 enables blocks of an individual file to be spread across multiple smart storage units 114. This data is stored such that access to the data provides a higher throughput rate than if the data was stored on a single device. In addition, the intelligent distributed file system 110 may be used to store a variety of data files which are stored using a variety of protection schemes.

The exemplary intelligent distributed file system 110 stores data among a set of smart storage units 114. For a more detailed description about the smart storage units 114, please refer to the section below entitled "Smart Storage Units."

The exemplary intelligent distributed file system makes use of a switch component 125, such as a load balancing switch, that directs requests to an application server that can handle the type of data that has been requested. The incoming requests are forwarded to the appropriate application servers using high-speed technology to minimize delays and to ensure data integrity.

It is recognized that a variety of load balancing switches 125 may be used, such as, for example, the 1000 Base-T (copper) Gigabit Load Balancing Ethernet Switch, the Extreme Networks Summit 7I, the Foundry Fast Iron II, the Nortel Networks Alteon ACEswitch 180, F5 Big-Ip), as well as standard Ethernet switches or other load balancing switches. The intelligent distributed file system makes use of a switch that supports large frame sizes, such as, for example, "jumbo" Ethernet frames. In addition, the load balancing switch 125 may be implemented using Foundry Networks' ServerIron switches, Asante's InstraSwitch 6200 switches, Asante's HotStack, Cisco's Catalyst switches, as well as other commercial products and/or proprietary products. One of ordinary skill in the art, however, will recognize that a wide range of switch components 125 may be used or that other technology may be used. Furthermore, it is recognized that the switch component 125 may be configured to transmit a variety of network frame sizes.

Files of high importance may be stored with high error correction parameters that provide the data with a high recovery rate in case of disk, motherboard, CPU, operating system, or other hardware or software failure that prevents access to one or more of the smart storage units. If any data is lost or missing, a smart storage unit 114 may use the redundancy information or mirroring information in the metadata to obtain the data from another location or to recreate the data. Files in high demand may be mirrored in real-time across the additional smart storage units 114 to provide even higher throughput rates.

In one embodiment of the intelligent distributed file system 110, the metadata data structure has at least the same protection as the data that it references including any descendants of the directory that corresponds to the metadata data structure. Loss of data in a metadata data structure harms the intelligent distributed file system 110 as it is difficult to retrieve the data without its metadata data structure. In the intelligent distributed file system 110, alternate copies of the metadata data structure may be mirrored in as many locations as necessary to provide the required protection. Thus, a file with parity protection may have its metadata data structure stored with at least the same or greater parity protection and a file mirrored twice may have its metadata data structure at least mirrored in two locations.

While FIG. 1 illustrates one embodiment of an intelligent distributed file system 110, it is recognized that other embodiments may be used. For example, additional servers, such as, application severs may communicate with the switch component 125. These application severs may include, for example, audio streaming servers, video streaming servers, image processing servers, database servers, and so forth. Furthermore, there may be additional devices, such as workstations, that communicate with the switch component 125. In addition, while FIG. 1 illustrates an intelligent distributed file system 110 working with four smart storage units 114, it is recognized that the intelligent distributed file system 110 may work with different numbers of smart storage units 114.

It is also recognized that the term "remote" may include devices, components, and/or modules not stored locally, that is not accessible via the local bus. Thus, a remote device may include a device which is physically located in the same room and connected via a device such as a switch or a local area network. In other situations, a remote device may also be located in a separate geographic area, such as, for example, in a different location, country, and so forth.

It is also recognized that a variety of types of data may be stored using the intelligent distributed file system 110. For example, the intelligent distributed file system 110 may be used with large file applications, such as, for example, video-on-demand, online music systems, web-site mirroring, large databases, large graphic files, CAD/CAM design, software updates, corporate presentations, insurance claim files, medical imaging files, corporate document storage, and so forth.

Figure 2:
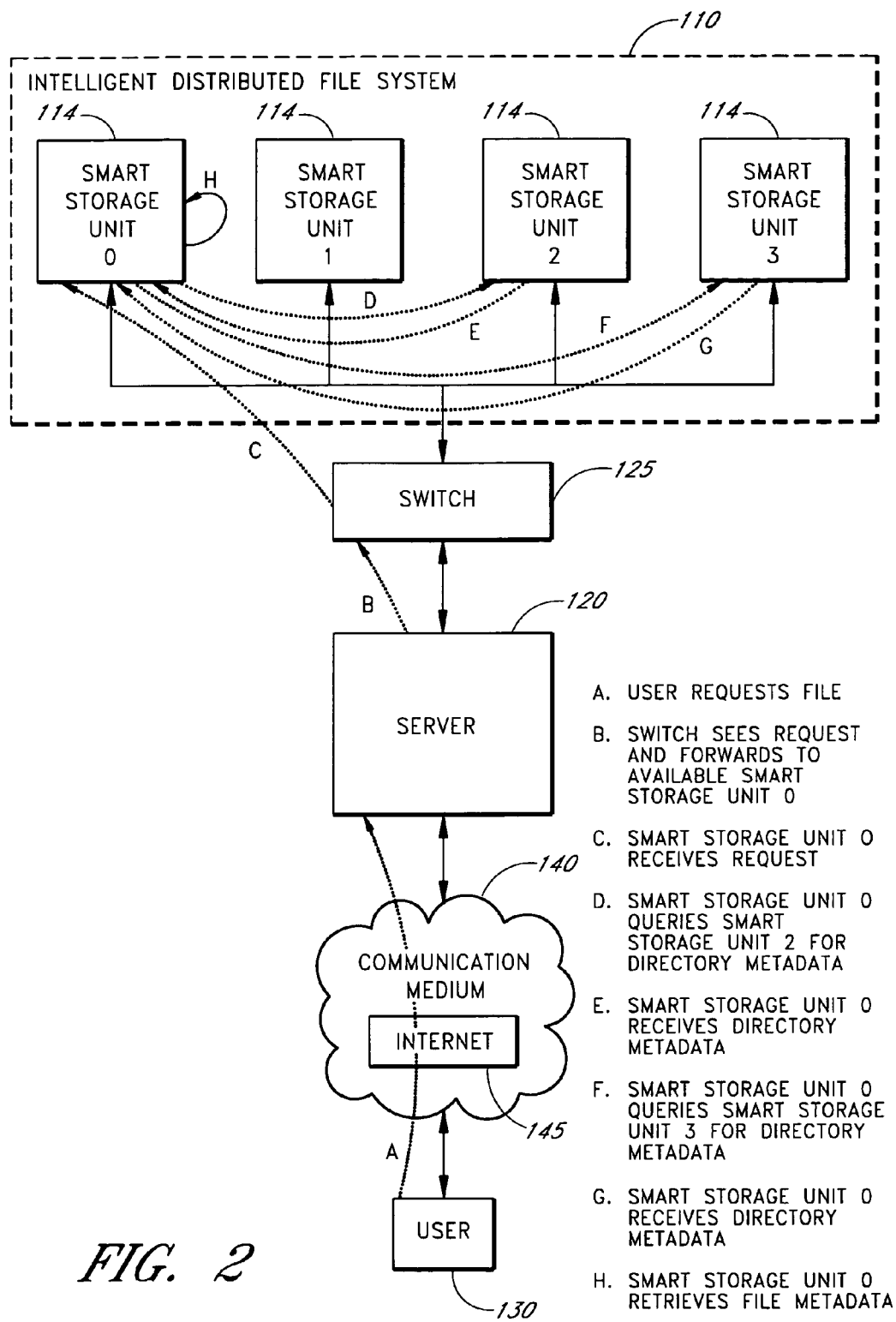
FIG. 2 illustrates a sample flow of data among the components illustrated in FIG. 1.

FIG. 2 illustrates a sample environment in which a web site user 130 has submitted a request to watch an on-demand digital video. In event A, the user 130 sends a request via the Internet 145 to a web site requesting to view a copy of the movie, mymovie.movie. The request is received by the web site's server 120, and the server 120 determines that the file is located at \movies\comedy\mymovie.movie. In event B, the switch component 125 of the intelligent distributed file system 110 sees the request to connect to the intelligent distributed file system 110 and forwards the request to an available smart storage unit 114, such as smart storage unit 0, using standard load balancing techniques. In event C, smart storage unit 0 receives the request for the file /DFSR/movies/comedy/mymovie.movie and determines from its root metadata data structure (for the root directory/DFSR) that the metadata data structure for the subdirectory movies is stored with smart storage unit 2. In event D, smart storage unit 0 sends a request to smart storage unit 2 requesting the location of the metadata data structure for the subdirectory comedy. In event E, smart storage unit 0 receives information that the metadata data structure for the subdirectory comedy is stored with smart storage unit 3. In event F, smart storage unit 0 sends a request to smart storage unit 3 requesting the location of the metadata data structure for the file mymovie.movie. In event G, smart storage unit 0 receives information that the metadata data structure for the file mymovie.movie is stored with smart storage unit 0. Smart storage unit 0 then retrieves the metadata data structure for the file mymovie.movie from local storage in event H. From the metadata data structure, smart storage unit 0 retrieves the data location table for mymovie.movie which stores the location of each block of data in the file. Smart storage unit 0 then uses the data location table information to begin retrieving locally stored blocks and sending requests for data stored with other smart storage units.

After the file's data or a portion of the data has been retrieved, the file data is sent to the requesting server 120 to be forwarded to the requesting user 130. In one example, the file data may be routed to a video streaming server which regulates how and when the data is sent to the user 130. It is recognized that in some embodiments, it may be advantageous to utilize read ahead techniques to retrieve more data then requested so as to reduce the latency of the requests.

IV. Intelligent File System Structure

Table 1 illustrates one embodiment of a sample set of file system layers through which a file request is processed in order to access the physical storage device. The exemplary file system layers include a User layer, a Virtual File System layer, a Local File System layer, a Local File Store layer, and a Storage Device layer.

TABLE 1

| | User Layer |
|---|---|
| User Space | |
| Kernel Space | |
| | Virtual File System Layer |
| | Local File System Layer |
| | Local File Store Layer |
| | Storage Device Layer |

In one type of file request, the request is received via a user-level protocol application for file sharing, such as, for example, HTTPD (the Apache web server), FTPD, or SMBD used on Unix which implements a version of the Microsoft Windows file sharing server protocol. The user-level protocol application performs a kernel level open, read, seek, write, or close system call, such as, for example, by making a function call to libc, the C runtime library.

The system call is passed onto the Virtual File System layer ("VFS"), which maintains a buffer cache. The buffer cache may be, for example, a least recently used ("LRU") cache of buffers used to store data or metadata data structures which are received from the lower file system layers.

The next layer is the Local File System layer which maintains the hierarchical naming system of the file system and sends directory and filename requests to the layer below, the Local File Store layer. The Local File System layer handles metadata data structure lookup and management. For example, in some systems, such as Unix-based file systems, the metadata data structure is a file abstraction which includes information about file access permissions, data block locations, and reference counts. Once a file has been opened via its name, other file operations reference the file via a unique identifier which identifies the metadata structure for the specific file. The benefits of this approach are that a single file may have many different names, a single file may be accessed via different paths, and new files may be copied over old files in the VFS namespace without overwriting the actual file data via the standard UNIX user level utilities, such as, for example, the 'mv' command. These benefits may be even more advantageous in environments such as content-delivery and web hosting because content may be updated in place without disrupting current content serving. The reference count within the metadata data structure enables the system to only invalidate the data blocks once all open file handles have been closed.

The fourth layer is the Local File Store layer which handles "buffer request to block request" translation and data buffer request management. For example, the Local File Store layer uses block allocation schemes to improve and maximize throughput for WRITES and READS, as well as block retrieval schemes for reading.

The last layer is the Storage Device layer which hosts the device driver for the particular piece of disk hardware used by the file system. For example, if the physical storage device is an ATA disk, then the Storage Device layer hosts the ATA disk driver.

While Table 1 illustrates one sample set of file system layers, H is recognized that the systems and methods may work with a variety of different layers as well as in different environments in which the file system layers may be defined differently or may not exist at all.

V. Smart Storage Units

In one embodiment, the smart storage unit 114 is a plug-and-play, high-density, rack-mountable appliance device that is optimized for high-throughput data delivery. The smart storage unit may be configured to communicate with a variety of other smart storage units so as to provide a single virtual file system. As more storage space is needed or if one or more of the smart storage units fail, additional smart storage units may be installed without having to take the entire system down or cause interruption of service.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may also be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

Figure 3:
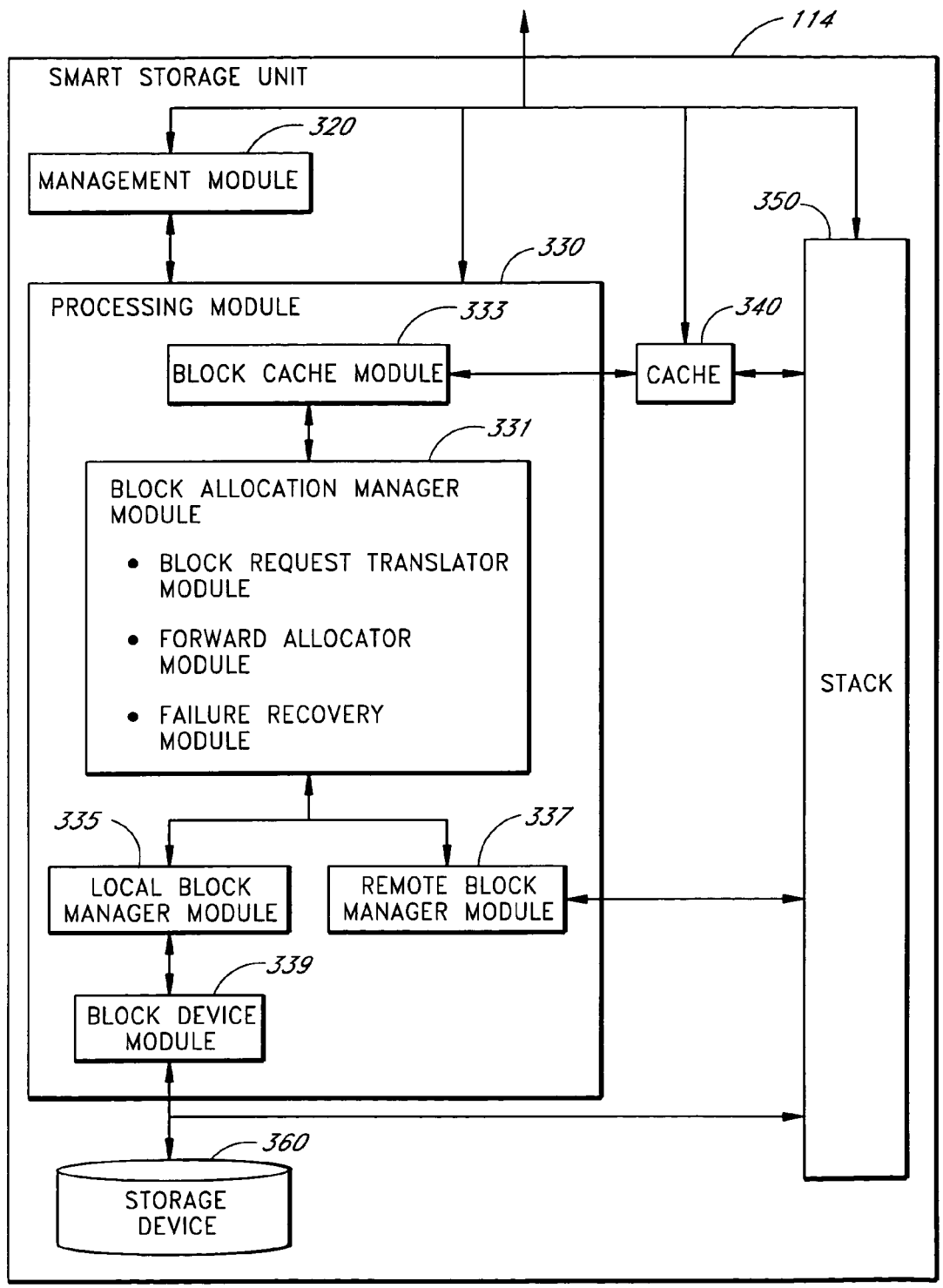
FIG. 3 illustrates a high-level block diagram of a sample smart storage unit.

FIG. 3 illustrates one embodiment of a smart storage unit 114 which includes a management module 320, a processing module 330, a cache 340, a stack 350, and a storage device 360. The exemplary smart storage unit 114 may be configured to communicate with the switch component 125 to send and receive requests as illustrated in FIG. 1.

A. Management Module

In one embodiment, the smart storage unit includes a management module 320 for performing management tasks, such as, for example, installation, parameter setting, monitoring of the intelligent distributed file system, logging of events that occur on the intelligent distributed file system 110, upgrading, and so forth.

B. Processing Module

The exemplary processing module 330 may be configured to receive requests for data files, retrieve locally and/or remotely stored metadata about the requested data files, and retrieve the locally and/or remotely stored data blocks of the requested data files. In addition, the processing module 330 may also perform data recovery and error correction in the event that one or more of the requested data blocks is corrupt or lost.

In one embodiment, the processing module 330 includes five modules to respond to the file requests, a block allocation manager module 331, a block cache module 333, a local block manager module 335, a remote block manager module 337 and a block device module 339.

1. Block Allocation Manager Module

The block allocation manager 331 module determines where to allocate blocks, locates the blocks in response to a READ request, and conducts device failure recovery. Information about where to allocate the blocks may be determined by policies set as default parameters, policies set by the system administrator via tools, such as a graphical user interface or a shell interface, or a combination thereof. In one embodiment, the block allocation manager 331 resides at the Local File System layer and works in conjunction with standard networking software layers, such as TCP/IP and Ethernet, and/or instead of Berkeley Software Design Universal File System ("BSD UFS").

The exemplary block allocation manager 331 includes three submodules, a block request translator module, a forward allocator module, and a failure recovery module.

a. Block Request Translator Module

The block request translator module receives incoming READ requests, performs name lookups, locates the appropriate devices, and pulls the data from the device to fulfill the request. If the data is directly available, the block request translator module sends a data request to the local block manager module or to the remote block manager module depending on whether the block of data is stored on the local storage device or on the storage device of another smart storage unit.

In one embodiment, the block request translator module includes a name lookup process which is discussed below in the section entitled "Intelligent Distributed File System Processes-Processing Name Lookups."

The block request translator module may also respond to device failure. For example, if a device is down, the block request translator module may request local and remote data blocks that may be used to reconstruct the data using, for example, parity information. Thus, the data may be generated even though the READ may not be performed. In addition, the block request translator module may communicate with the failure recovery module such that the failure recovery module may re-create the data using parity or other error or loss correction data and re-stripe the loss correction data across free space in the intelligent distributed file system. In other embodiments, the block request translator module may request clean copies of corrupt or missing data.

b. Forward Allocator Module

The forward allocator module determines which device's blocks should be used for a WRITE request based upon factors, such as, for example, redundancy, space, and performance. These parameters may be set by the system administrator, derived from information embedded in the intelligent distributed file system 110, incorporated as logic in the intelligent distributed file system 110, or a combination thereof. The forward allocator module 110 receives statistics from the other smart storage units that use the intelligent distributed file system, and uses those statistics to decide where the best location is to put new incoming data. The statistics that are gathered include, for example, measurements of CPU utilization, network utilization, and disk utilization.

The forward allocator module may also receive latency information from the remote block manager module based upon the response times of the remote smart storage units. If the inter-device latency reaches a high level relative to other smart storage units, the allocation schemes may be adjusted to favor other smart storage units underutilizing the slow smart storage unit, if possible, based on the redundancy settings. In one advantageous example, the intelligent distributed file system may have moved blocks of data from one smart storage unit to another smart storage unit, updating the corresponding metadata structures accordingly. The latency conditions may be logged through a logging system and reported to the system administrator. Reasons for slow link conditions may be, for example, bad network cards, incorrect duplex negotiation, or a device's data being relatively frequently read or written to.

A variety of strategies may be used to determine where to store the data. These strategies may be adjusted depending on the goals of the system, such as, compliance with parameters or preferences set by the system's administrator, meeting of selected redundancy levels, and/or performance improvement. The following provides a few sample strategies that may be employed by the forward allocator module to store data. It is recognized that a wide variety of strategies may be used in addition to or in conjunction with those discussed below.

The forward allocator module may include an allocation scheme for striping data across multiple smart storage units. Striping data is a common technology typically used in high-end RAID storage devices, but may be employed in single user workstation machines with multiple disks. Striping data simply means that different portions of a file's data live and/or are stored on different storage devices or disks. The advantage to striping data is that when READ requests span the blocks located on multiple disks, each disk participates in the aggregate throughput of data retrieval. With typical systems, striping of data is done at the software device layer. That is, the file system has no information about the striping of the data. Only the software layer underneath the file system understands this structure. In some specialized pieces of hardware, this striping is done even below the software device layer at the actual hardware layer. In the intelligent distributed file system 110, the file system itself handles the striping of data. This implementation provides greater flexibility with striping configurations. As an example, typical RAID technologies are limited in that all disks must be of the same size and have the same performance characteristics. These constraints are necessary to ensure that data is spread evenly across the different devices. For a more detailed discussion about RAID, please refer to "The RAID Book," by Paul Massiglia, Sixth Edition (1997), which is herein incorporated by reference.

In addition, the forward allocation module may perform the restriping of data in response to a user request (e.g., a change in protection scheme addition of new smart storage units, etc.) and/or in response to the system (e.g., detection of a failed smart storage unit). It is recognized, however, that the restriping may be performed by or in conjunction with other modules in the block allocation manager module, or by or in conjunction with other parts of the smart storage unit.

With the intelligent distributed file system 110, differing disks and disk sizes may be used in various smart storage units 114 and participate in the file striping. The forward allocator module looks up in the root metadata data structure for disk device information and calculates the number of smart storage units across which the file data should be spread using performance metrics or preset rules. The forward allocator module may then allocate the blocks of the file to a set of smart storage units.

The forward allocator module may also include an allocation scheme for parity or other error or loss correction protection. In most RAID systems, when file striping is used, parity protection is also used such that all of the disks, except one, are used for data storage. The last disk is purely used for parity information. This parity information is typically calculated by taking a bitwise exclusive or ("XOR") of each block of data across all of the data disks. This parity information is used to perform data recovery when a disk failure occurs. The lost data is recalculated from taking the bitwise XOR of the remaining disks' data blocks and the parity information. In typical RAID systems, the data is unrecoverable until a replacement disk is inserted into the array to rebuild the lost data.

With the intelligent distributed file system 110, the lost data may be re-computed and re-written in free space on other portions of the remaining smart storage units because the parity protection takes place at the file system layer instead of the software device layer. If there is not enough free space left to re-write the data, the parity data may be overwritten with re-calculated data, and the fact that the redundancy has dropped below the original levels may be logged and/or reported to the system administrator.

The forward allocator module may also include an allocation scheme for mirroring of data, that is making multiple copies of the data available on different smart storage units. The forward allocator module may use an allocation scheme to load balance the locations of the blocks of the data across the smart storage units using those smart storage units that are least used in terms of storage space, network utilization, and/or CPU utilization. Mirroring may provide increased performance and increased fault tolerance. If mirroring is requested for certain pieces of content, the forward allocator module allocates space for the original data as well as the mirrored data. If a fault tolerance level of greater than one is requested, the forward allocator may logically divide the smart storage units, or a subset of the smart storage units, by the fault tolerance count and create mirrors of striped data. For example, if there are ten smart storage units 114 in an intelligent distributed file system 110, and a fault tolerance of two is requested, then the forward allocator may logically break the intelligent distributed file system into two sections of five smart storage units each, stripe the data across four smart storage units in each section, and use the fifth smart storage units from each section as a parity disk. This division of smart storage units may be referred to as an array mirror split. Various implementations of an array mirror split may be used including implementations in which the data is overlapped or skewed when stored.

C. Failure Recovery Module

The failure recovery module reconfigures the intelligent distributed file system 110, in real-time, to recover data which is no longer available due to a device failure. The failure recovery module may perform the reconfiguration without service interruptions while maintaining performance and may return the data to desired redundancy levels in a short period of time.

As discussed above, the remote block manager module 337 detects failures and passes notification of such failures to the failure recovery module. For an initial failure, the failure recovery module locates any data blocks that do not meet the redundancy parameters as requested by the system administrator or as set by the intelligent distributed file system 110.

First, data that can be recreated from parity information is recreated and a request is sent to the forward allocator module to allocate space for the new data. The forward allocator monitors CPU and network utilization and begins operation aggressively until CPU and network utilization reaches a predetermined mark. This predetermined mark may be set by the system administrator or pre-set according to factors such as, for example, the computer processor. Once the mark is reached, the failure recovery module may advantageously re-calculate data at the rate achieved at the time of the mark to reduce impact on the smart storage unit's performance.

If a recently failed device comes back online, the failure recovery module communicates with the remote block manager module 337 of the recovered device to verify data integrity and to fix any inconsistencies.

The intelligent distributed file system 110 may also support the inclusion of a hot standby device. The hot standby device is an idle storage device that is not currently handling any data storage, but will be put into use at the time of a device failure. In such a situation, the failure recovery module may rebuild the lost data using the hot standby device by communicating with the hot standby device's remote block manager module 337.

2. Block Cache Module

The block cache module 333 manages the caching of data blocks, name looks ups, and metadata data structures. In one embodiment, the block cache module 333 works in conjunction with or instead of BSD Virtual File System's buffer cache.

The block cache module 333 may cache data blocks and metadata data blocks using the Least Recently Used caching algorithm, though it is recognized that a variety of caching algorithms that may be used, such as, for example, frequency caching. The block cache module 333 may determine which block caching algorithm to use depending on which performs the best, or in other embodiments, an algorithm may be set as the default.

Least Recently Used caching ("LRU") is the typical caching scheme used in most systems. LRU is based on the principle that once data is accessed it will most likely be accessed again. Thus, data is stored in order of its last usage such that data that has not been accessed for the longest amount of time is discarded.

Frequency caching stores data that has been most frequently accessed. Because disk writes are relatively time intensive operations, additional performance may be gained by tracking access frequencies in the metadata data structures and caching based on access frequencies.

In addition, the block cache module 333 may utilize an "on demand" protocol or a "read ahead" protocol wherein more data is requested than required. The block cache module 333 may send a request for a set of data and also request some amount of data ahead of the set of data. For example, the block cache module 333 may perform read aheads, such as one packet read aheads, two packet read aheads, ten packet read aheads, twenty packet read aheads, and so forth. In other embodiments, the block cache module 333 may utilize read ahead techniques based upon the latency of the request. For example, the block cache module 333 may perform V packet read aheads where V is calculated using the read rate and the latency of the link. The block cache module 333 may also use other algorithms based on CPU and network utilization to determine the size of the read ahead data. Furthermore, the block cache module 333 may utilize a set caching protocol, or may vary the caching protocol to respond to the system's performance levels.

The cache 340 may be implemented using the default sizes provided with general multi-user operating systems or modified to increase the cache block size to a different amount but without severely impacting system performance. Such modifications may be determined by various performance tests that depend upon factors, such as, for example, the type of data being stored, the processing speed, the number of smart storage units in the intelligent distributed file system, and the protection schemes being used.

3. Local Block Manager Module

The local block manager module 335 manages the allocation, storage, and retrieval of data blocks stored locally on the storage device 360. The local block manager 335 may perform zero copy file reads to move data from the disk to another portion of the storage device 360, such as, for example, the network card, thereby improving performance. The local block manager 335 may also perform modifications based upon the storage device 360 being used so as to increase performance. In one embodiment, the local block manager module 335 resides at the Local File Store layer and may work in conjunction with or instead of FreeBSD Fast File System.

In one embodiment, the local block manager module 335 processes requests to store the data on the storage device 360. In one embodiment, the local block manager module 335 determines where the data is stored on the storage device 360. For example, the local block manager module 335 may attempt store related data contiguously such that when it receives data that relates to already stored data, the new data is stored as close to the related data as possible. It is recognized, however, that a variety of storage preferences may be used and that each smart storage unit may use one or more different storage preferences. In other embodiments, all of the smart storage units in the intelligent distributed files system may use the same storage preferences.

4. Remote Block Manager Module

The remote block manager module 337 manages inter-device communication, including, for example, block requests, block responses, and the detection of remote device failures. In one embodiment, the remote block manager module 337 resides at the Local File System layer.

In one embodiment, the smart storage units 114 may be connected to and/or communicate with the other smart storage devices 114 in the intelligent distributed file system 110 via the remote block managers 337.

The remote block manager modules 337 may enable the smart storage units 114 to talk to each other via a connection such as TCP. In one embodiment, there are at least two TCP connections for each smart storage unit, one for file data transportation and one for control message transportation. The advantage of this dual channel TCP communication architecture is that as long as data blocks are sent in multiples of page sizes, the data may be sent via DMA transfer directly from the network interface card to system memory, and via DMA transfer from system memory to another portion of the system (possibly the network interface card again) without the need for the data to be copied from one portion of system memory to another. This is because there is no need for the CPU to be involved in parsing the data packets as they do not contain non-data headers or identifying information since this information is transferred on the control channel. In high performance server and operating systems, these memory copies from one portion of system memory to another become a severe limitation on system performance.

In one embodiment, the remote block manager modules 337 communicate using messaging communication utilizing messages, such as, for example, data block access messages (e.g. READ, READ_RESPONSE, WRITE, and WRITE_RESPONSE), metadata access messages (e.g., GET_INODE, GET_INODE_RESPONSE, SET_ADDRESS, GET_ADDRESS, and INVALIDATE_INODE), directory messages (e.g., ADD_DIR and REMOVE_DIR), status messages, as well as a variety of other types of messages.

While a dual channel protocol is discussed above, it is recognized that other communication protocols may be used to enable communication among the smart storage units 114.

5. Block Device Module

The block device module 339 hosts the device driver for the particular piece of disk hardware used by the file system. For example, if the physical storage device is an ATA disk, then the block device module 339 hosts the ATA disk driver.

C. Cache

The cache memory or cache 340 may be implemented using a variety of products that are well known in the art, such as, for example, a 1 G RAM cache. The cache 340 illustrated in FIG. 3 may store blocks of data that have recently been accessed or are to be accessed within a set amount of time. The cache 340 may be implemented using a high-speed storage mechanism, such as a static RAM device, a dynamic RAM device, an internal cache, a disk cache, as well as a variety of other types of devices. Typically, data is accessed from a cache 340 faster than the time it takes to access the non-volatile storage device. The cache 340 stores data such that if the smart storage unit 114 needs to access data from the storage device 360, the cache 340 may be checked first to see if the data has already been retrieved. Thus, use of the cache 340 may improve the smart storage unit's performance in retrieving data blocks.

D. Network Stack

In one embodiment, the smart storage unit 310 also includes a network stack 350 that handles incoming and outgoing message traffic using a protocol, such as, for example, TCP/IP. It is recognized, however, that other protocols or data structures may be used to implement the stack 350.

E. Storage Device

The storage device 360 is a set of one or more non-volatile memory devices, that may be used to store data blocks. The storage device 360 may be implemented using a variety of products that are well known in the art, such as, for example, a 41.25 GB ATA100 device, SCSI devices, and so forth. In addition, the size of the storage device 360 may be the same for all smart storage units 114 in an intelligent distributed file system 110 or it may be of varying sizes for different smart storage units 114.

F. System Information

In one embodiment, the smart storage unit 114 runs on a computer that enables the smart storage unit 114 to communicate with other smart storage units 114. The computer may be a general purpose computer using one or more microprocessors, such as, for example, a Pentium processor, a Pentium II processor, a Pentium Pro processor, a Pentium IV processor, an xx86 processor, an 8051 processor, a MIPS processor, a Power PC processor, a SPARC processor, an Alpha processor, and so forth.

In one embodiment, the processor unit runs the open-source FreeBSD operating system and performs standard operating system functions such opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, or IBM® OS/2® operating systems.

In one embodiment, the computer is equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the computer may be configured to support a variety of network protocols such as, for example NFS v2/v3 over UDP/TCP, Microsoft® CIFS, HTTP 1.0, HTTP. 1.1, DAFS, FTP, and so forth.

In one embodiment, the smart storage device 114 includes a single or dual CPU 2U rack mountable configuration, multiple ATA100 interfaces, as well as a 1000/100 Network Interface Card that supports jumbo 9K Ethernet frames. It is recognized, however, that a variety of configurations may be used.

As noted above, while different modules have been discussed with respect to the smart storage unit, it is recognized that the tasks may be performed by different modules. In addition, one or more of the modules could be combined and/or one or more new modules may be added such that one particular module is not required to perform a specific task.

VI. Intelligent Distributed File System Data Structures

Figure 4:
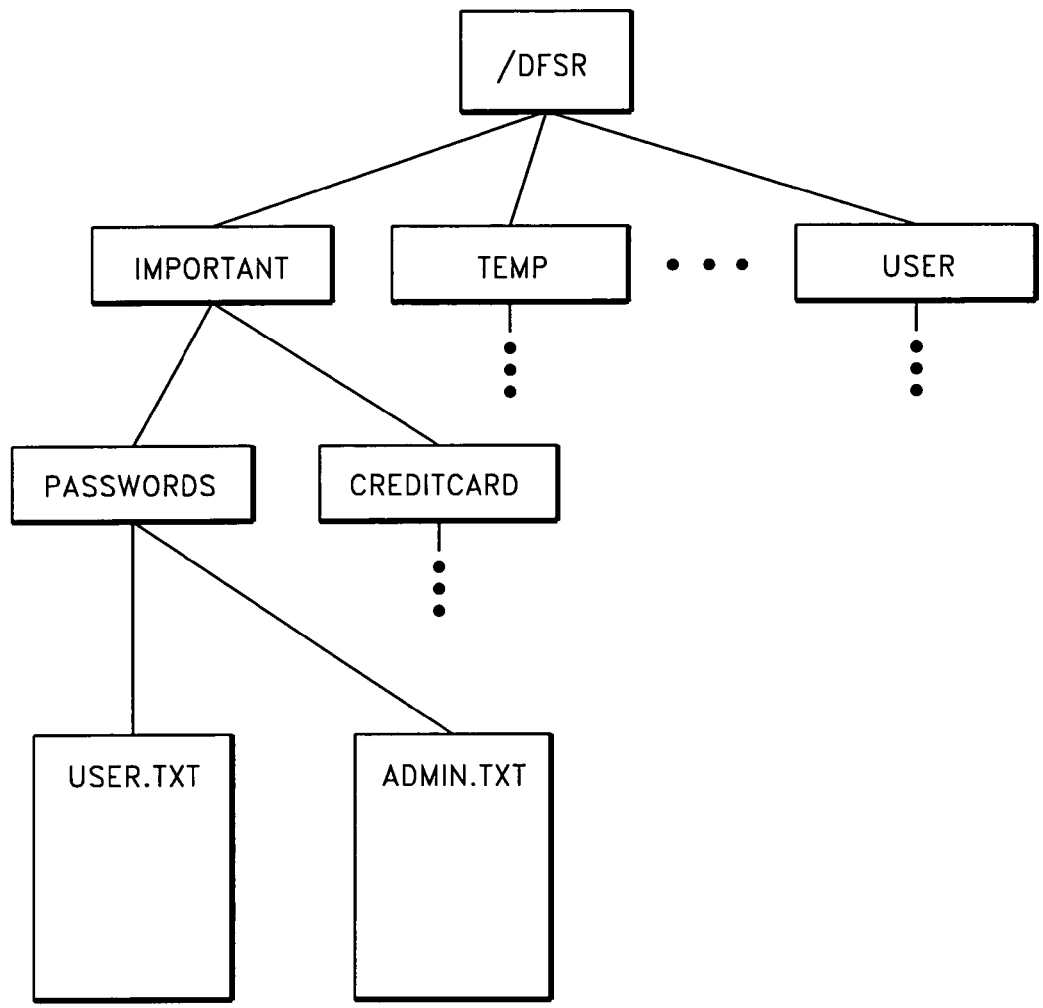
FIG. 4 illustrates a sample file directory.

FIG. 4 illustrates a sample directory structure that may be used with the intelligent distributed file system. In this example, the ROOT directory is named "DFSR" and includes subdirectories IMPORTANT, TEMP, and USER. The IMPORTANT subdirectory includes the subdirectories PASSWORDS and CREDITCARD. The files USER.TXT and ADMIN.TXT are stored in the PASSWORDS subdirectory. Thus, the address for the USER.TXT file is:

/DFSR/IMPORTANT/PASSWORDS/USER.TXT

Information or metadata about the directories and the files is stored and maintained by the intelligent distributed file system 110.

A. Metadata Data Structures

Figure 5:
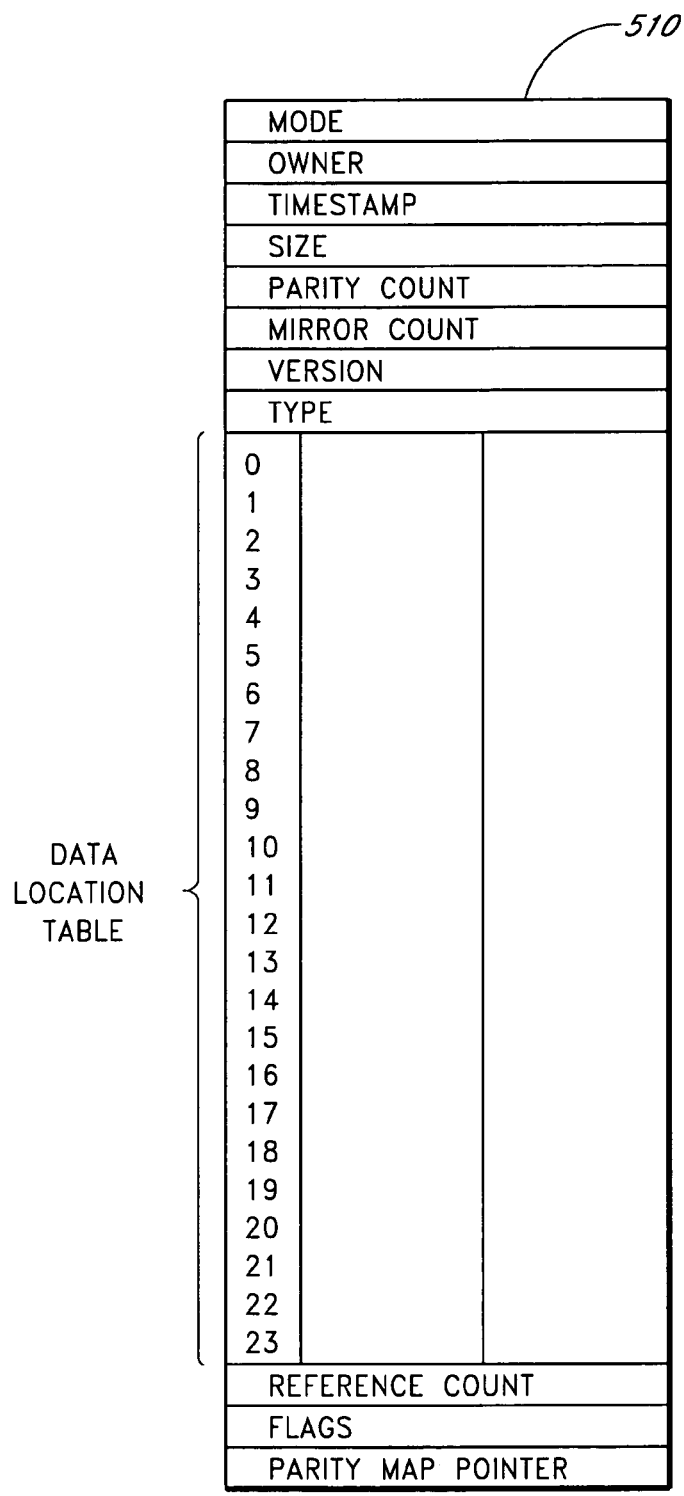
FIG. 5 illustrates one embodiment of a metadata data structure.

FIG. 5 illustrates a sample data structure 510 for storing metadata. The exemplary data structure 510 stores the following information:

| Field | Description |
|---|---|
| Mode | The mode of the file (e.g., regular file, block special, character special, directory, symbolic link, fifo, socket, whiteout, unknown) |
| Owner | Account on the smart storage unit which has ownership of the file |
| Timestamp | Time stamp of the last modification of the file |
| Size | Size of the metadata file |
| Parity Count | Number of parity devices used |
| Mirror Count | Number of mirrored devices used |
| Version | Version of metadata structure |
| Type | Type of data location table (e.g., Type 0, Type 1, Type 2, or Type 3) |
| Data Location Table | Address of the data location table or actual data location table information |
| Reference Count | Number of metadata structures referencing this one |
| Flags | File permissions (e.g., standard UNIX permissions) |
| Parity Map Pointer | Pointer to parity block information |

It is recognized that the sample data structure 510 illustrates one embodiment of a data structure 510 for storing metadata and that a variety of implementations may be used in accordance with the invention. For example, the data structure 510 may include different fields, the fields may be of different types, the fields may be grouped and stored separately, and so forth.

FIGS. 6A, 6B, 6C, and 6D provide sample data location table structures for the types of data location tables, that is Type 0, Type 1, Type 2, and Type 3 respectively. In FIG. 6A, the Type 0 data location table includes 24 direct block entries meaning that the entries in the data location table include device/block number pairs which indicate the location in which the data is stored. In FIG. 6B, the Type 1 data location table includes 15 direct block entries, three single-indirect entries, three double-indirect entries, and three triple-indirect entries. The entries for the single-indirect entries indicate the locations in which an additional data location table of direct entries is stored. The entries for the double-indirect entries indicate the locations in which data location tables are stored wherein the data location tables include single-indirect entries. The entries for the triple-indirect entries indicate the locations in which data location tables are stored wherein the data location tables include double-indirect entries.

Because any block may be mirrored across any number of devices, the metadata data structure 510 is flexible enough to represent blocks with multiple locations and still provide the fast access that comes from direct indexing within a fixed space. Thus, a type may advantageously be associated with the metadata data structure 510 to indicate the type of data location table to be used. In one embodiment of the metadata data structure 510, there may be room for 24 data entries, such as, for example, 24 pointers.

Type 0 may be used when a data file is small; the data location addresses are stored as direct entries. Thus, a Type 0 metadata data structure includes 24 direct entries. Type 1 may be used to support larger files and mirror of up to two times (three copies of the file). Type 1 uses 15 direct entries, three single-indirect entries, three double-indirect entries, and three triple-indirect entries. Type 2 may be used to support mirroring of up to 7 times (8 copies of the file), and includes eight single-indirect entries, eight double-indirect entries, and eight triple-indirect entries. Type 3 data location tables enable even further mirroring as all of the disk addresses are stored as triple-indirect entries. As a result, up to 24 complete file copies may be stored.

It is recognized that a variety of data location tables may be used and that FIGS. 6A, 6B, 6C, and 6D illustrate sample embodiments. In other embodiments, for example, the data location tables may include a different mixture of direct and indirect entries. Further, in other embodiments, the data location tables may include an entry field that designates the type of entry for each entry in the table. The types may include, for example, those discussed above (e.g., direct, single-indirect, double-indirect, triple-indirect) as well as others (e.g., quadruple-indirect, etc.). In addition, the data location table may include deeper nesting of data location tables up to X levels wherein X is an integer.

The metadata data structure may also include information about which smart storage units contain the file's content data and protection data. In addition, the metadata data structures may store information for each smart storage unit tracking the last block address used for the file's content data and the last block address used for the file's protection data. For example, the metadata data structure may record that MYFILE.TXT has its data stored on Device 0, Device 2, Device 3, and Device 5. The metadata data structure may also record the following:

|  | Last Block Address for Content | Last Block Address for Parity |
|---|---|---|
| Device 0 | 300 | 001 |
| Device 2 | 307 | 203 |
| Device 3 | 200 | 303 |
| Device 5 | 103 | 501 |

1. Directory Metadata

FIG. 7A illustrates a sample set of metadata for the directory PASSWORDS. In FIG. 7A, the data structure stores information about the PASSWORDS directory. The directory is mirrored twice (three copies total). Because a directory structure is relatively small (e.g., it fits within a block), there are only three direct pointers used, one for each copy. The sample set of metadata includes a data location table 710 which includes direct entries 720 indicating the location of the data block using a device/block number pair as well as a set of unused block entries 730.

2. File Metadata

Figure 7B:
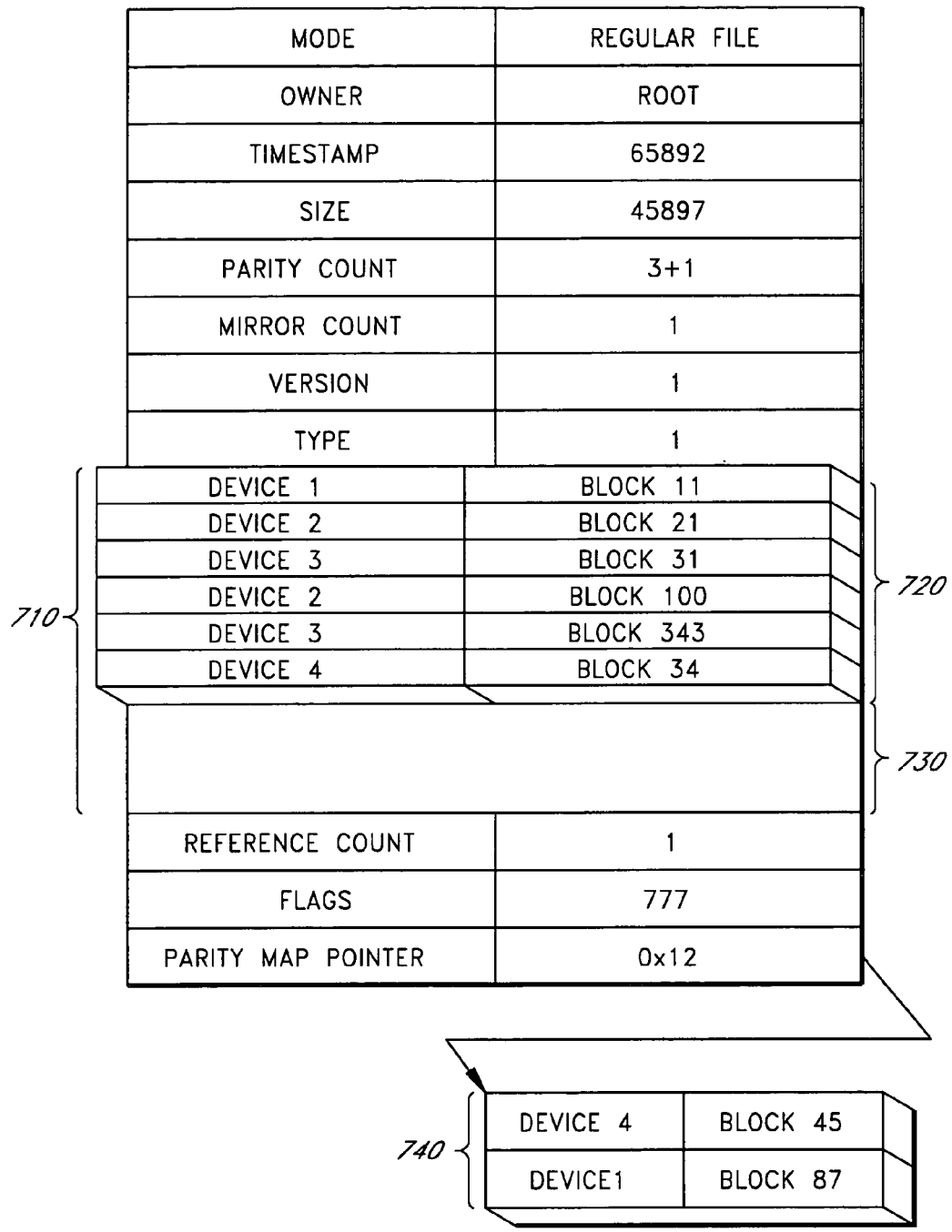
FIG. 7B illustrates one embodiment of a metadata data structure for a file.

FIG. 7B illustrates a sample set of metadata for the file USER.TXT. In FIG. 7B, the data structure stores information about the USER.TXT file. There is one copy of each of the data blocks for the USER.TXT file data and the data is protected using a 3+1 parity scheme. The content data for USER.TXT is of size 45K and the block size is 8K, thus, there are 6 blocks of data with the 6th block of data not fully used. The data location table 710 shows the location in which each of the 6 blocks of data are stored 720, wherein the blocks of data are referenced by device number and block number and where the first entry corresponds to the first block of data. Further, the location of the parity information for the content data is stored in a parity map 740 whose location is designated by the last location of the data structure as "parity map pointer." The USER.TXT file is stored using a 3+1 parity scheme thus, for every three blocks of data, a block of parity data is stored. Because there are six blocks in this 3+1 parity scheme, there are two blocks of parity data (6 divided by 3 and rounding up to the nearest integer). The parity map shows the location in which both of the blocks of parity data are stored, wherein the blocks of parity data are referenced by device number and block number and where the first entry corresponds to the first block of parity data.

B. Data Location Table Data Structures

The intelligent distributed file system 110 may provide storage for a wide variety of data files as well as flexibility as to how the data files are stored. Redundancy and mirroring of data files is performed at the file system level enabling the intelligent distributed file system 110 to support varying redundancy parameters for different files. For example, some directories may be mirrored, parity protected, or not protected at all.

Figure 8A:
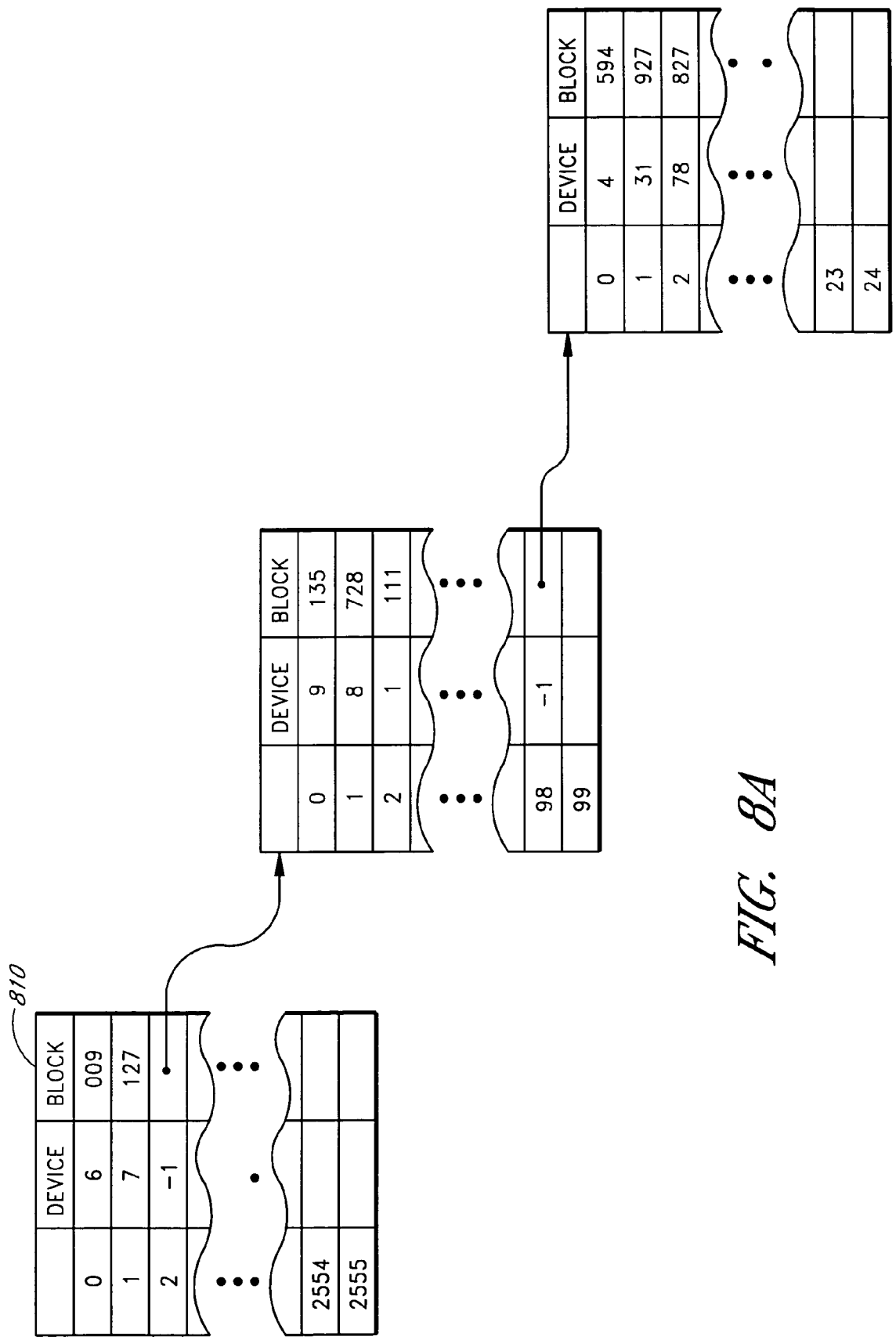
FIG. 8A illustrates one embodiment of a data location table.

FIGS. 8A, 8B, and 8C illustrate example data location tables that may be used to store data location information for data files of varying protection types and levels. FIGS. 8A, 8B, and 8C are meant to illustrate various data location tables, and it is recognized that a variety of different formats and/or structures may be used.

FIG. 8A illustrates a sample data location table 810 that indicates where each block of data of the corresponding file is stored. Note that the corresponding metadata for the file, such as that in FIG. 7B, is not shown, though it is recognized that the data location table 810 may correspond to a set of metadata. The exemplary data location table 810 includes both direct entries and indirect entries.

The direct entry includes a device ID/block pair. The device ID indicates the smart storage unit on which the data is stored, and the offset or block address indicates the location on the storage device where the data is stored. One sample entry in the data location table may be:

| Entry | Device | Block |
|-------|--------|-------|
| 1     | 7      | 127   | indicating that Block 1 of the data is stored on device number 7 at block 127.

The sample data location table 810 may also include indirect entries which point to additional data location tables enabling a data location table to track data locations for a larger set of data. While the level of indirect entries is theoretically unlimited, the levels may be advantageously limited so as to improve throughput rates. For example, the data location table may be limited to only allow at most double-indirect entries or at most triple-indirect entries. The exemplary data location table 810 illustrates two levels of indirect entries.

Further, the last entry of the data location table may be reserved to store the address of the parity map (if any). In other examples, the address of the parity map may be stored in other locations, such as, for example, as an entry in the metadata data structure. If a set of data does not include parity protection, the address value may be set to a standard value, such as NULL.

FIG. 8B illustrates a data location table for data that has been mirrored in two additional locations. The data location table includes a device ID and a block or offset address for each copy of the data. In the exemplary data location table, the mirrored locations have been selected on a block-by-block basis. It is recognized that other schemes may be used such as, for example, selecting one or more smart storage units to mirror specific smart storage units. While the data location table in FIG. 8B includes only direct entries, it is recognized that indirect entries may also be used.

In one embodiment, the mirroring information for a file may be stored in the file's corresponding metadata structure. This information may include, for example, number of copies of the data, as well as the locations of the data location table for each copy. It is recognized that the data location tables may be stored as a single data structure, and/or separate copies of the data location tables may be stored in different locations.

The sample data location table of FIG. 8B with mirrored data does not include parity protection though it is recognized that the data location table may include parity information.

FIG. 8C illustrates a data location table with a parity map. In the exemplary data location table, the data is being protected using a 3+1 parity scheme, that is a set of parity data is being created from every three blocks of data. Techniques well known in the art for creating data may be used, such as, for example, by XORing the blocks of data together on a bit-by-bit, byte-by-byte, or block-by-block basis to create a parity block.

The exemplary data location table provides information about a data file that consists of 21 data blocks (block 0 to block 20). Because the parity scheme is 3+1, a parity block is created for each set of three data blocks. Table 2 illustrates the correspondence between some of the data blocks and some of the parity blocks shown in FIG. 8C.

TABLE 2

| Data Blocks | | | Parity Blocks |
|---|---|---|---|
| 0 | 1 | 2 | 0 |
| Device 5 | Device 9 | Device 7 | Device 0 |
| Block 100 | Block 200 | Block 306 | Block 001 |
| 3 | 4 | 5 | 1 |
| Device 5 | Device 9 | Device 7 | Device 8 |
| Block 103 | Block 203 | Block 303 | Block 001 |

The sample data location table includes a parity map or parity location table. In the exemplary parity map, there is a one to one mapping between the set of block entries used to create data and the parity map. In other embodiments, the parity map also includes variable size entries which specify which blocks, by device and block number, may be parity XORed together to regenerate the data, in the event that it is not available in any of its direct locations, due to device failure. In other embodiments, the parity generation scheme is pre-set such that the location and correspondence of parity data may be determined by the intelligent distributed file system 110 without specifying the blocks which should be XORed together to regenerate data.

In one embodiment, the parity map is pointed to by the metadata data structure, such as, for example, in the last entry of the metadata data structure, rather than included in the metadata data structure. This map may be pointed to, instead of included directly in the metadata structure because its usage may only be required in the uncommon case of a failed smart storage unit 114. The parity map may also use variable sized entries to express the parity recombine blocks enabling the smart storage unit 114 to traverse the parity map a single time while rebuilding the data and to parse the parity map as it is traversed. In some situations, the compute and I/O time to retrieve and parse an entry is negligible compared to the parity compute time.

The sample data location table 810 of FIG. 8C with parity location information does not include mirroring information or indirect entries, though it is recognized that one or both may be used in conjunction with the parity location information. Further, it is recognized that other data structures may be used and that the data location table data structure is meant to only illustrate one embodiment of the invention.

C. Sample Data

Figure 9:
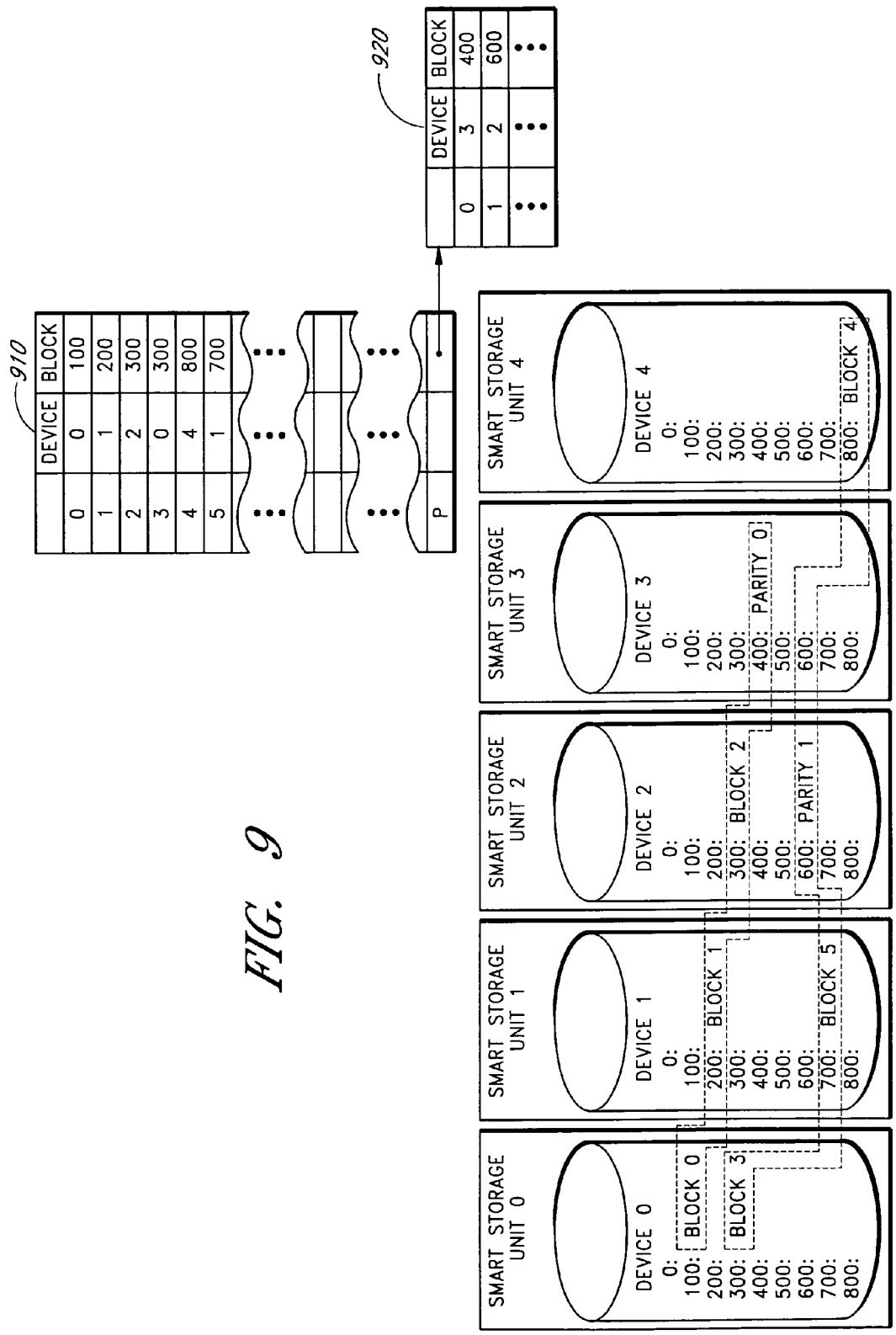
FIG. 9 illustrates a sample metadata data structure of a file with corresponding sample data.

FIG. 9 illustrates a sample data location table 910 and parity map 920 and the corresponding devices on which the data is stored. The example of FIG. 9 shows how data may be stored in varying locations on the devices, that the "stripes" of data are stored across different offset addresses on each device, and that the parity data may be stored in various devices, even for data from the same file. In other embodiments, the data may be stored at the same offset address on each device.

For example, the parity data for the first stripe is stored on device 3 at location 400 and relates to data block 0 stored on device 0 at location 100, data block 1 stored on device 1 at location 200, and data block 2 stored on device 2 at location 300. The parity data for the second stripe is stored on device 2 at location 600 and relates to data block 3 stored on device 0 at location 300, data block 4 stored on device 4 at location 800, and data block 5 stored on device 1 at location 700.

In some embodiments, the individual smart storage unit decides where and/or how to map the locations to the actual locations on disk. For example, if device 0 has 4 physical hard disks, and each hard disk has the storage capacity for 100 blocks, then device 0 would allow for storage to location 0 to location 399. One sample set of guidelines that may be used to determine how the location maps to the block on disk is as follows:

Disk number=floor of (location/number of blocks per disk)
Block on disk=location MOD number of blocks per disk.

Note that MOD is a modulus operator that takes the remainder of a division. It is understood that the guidelines above represent only a sample of the guidelines that may be used for mapping locations to disk and disk block, and that many other guidelines or schemes could be used. For example, one embodiment may utilize a linked list of block ranges representing each disk and conduct a list traversal. A linked list has the advantage of allowing for multiple sized disks.

Due to the flexibility of the storage of data and parity information, as new smart storage units are added, new data may be stored on the new smart storage units and/or existing data may be moved to the new smart storage units (e.g., by making a copy before deleting the data on the existing unit) without disrupting the system. In addition, data blocks or entire files may be moved or copied in real-time in response to high request volume, disk failure, changes in redundancy or parity parameters, and so forth.

VII. Intelligent Distributed File System Processes

A. Retrieving Data

Figure 10:
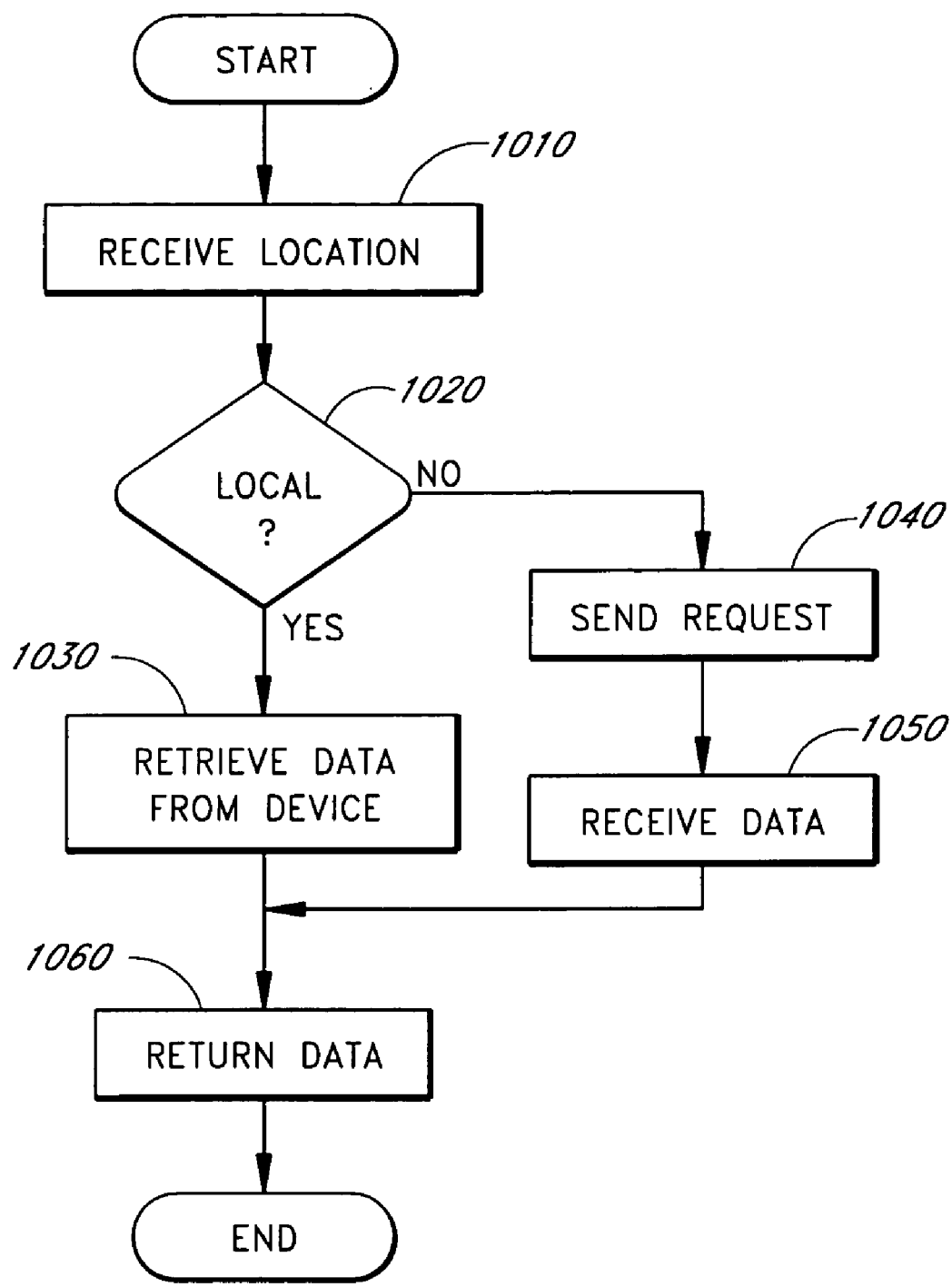
FIG. 10 illustrates one embodiment of a flow chart for retrieving data.

FIG. 10 illustrates one embodiment of a flow chart for retrieving data ("retrieve data process"). A variety of data types may be retrieved, such as, for example, directory metadata, file metadata, content data, and so forth.

Beginning at a start state, the retrieve data process receives the location at which the data is stored (state 1010). In one embodiment, the location may be designated using a smart storage unit ID and an offset or block address. In other embodiments, the storage device's ID may be used, whereas in other embodiments, a table may be used to map the IDs onto other IDs, and so forth.

Next, the retrieve data process determines whether the data is stored locally (state 1020). If the data is stored locally, then the retrieve data process retrieves the data from local storage (state 1030). In one embodiment, the retrieve data process may first check the cache and if the data is not there, then check the storage device. In other embodiments, the retrieve data process may check only the storage device.

If the data is not stored locally, then the retrieve data process sends a request for the data to the smart storage unit on which the data is stored (state 1040). In one embodiment, the request is sent via the switch component 125 shown in FIG. 1. The receive data process then receives the requested data (state 1050).

The retrieve data process collects the data that has been requested and returns the data (state 1060). In some embodiments, the data is returned after the entire set of data has been collected. In other embodiments, portions or sets of the data are returned as the data is retrieved form local storage or received from other smart storage units. The portions may be return in sequential order according to the file location table or they may be returned as they are retrieved or received. After the data has been returned, the retrieve data process proceeds to an end state.

It is recognized that FIG. 10 illustrates one embodiment of a retrieve data process and that other embodiments may be used. In another example, more than one retrieve data process may be used at the same time such that data is being retrieved by multiple retrieve data processes in parallel using techniques or combination of techniques, such as, for example, parallel processing, pipelining, or asynchronous I/O.

B. Processing Name Lookups

Figure 11:
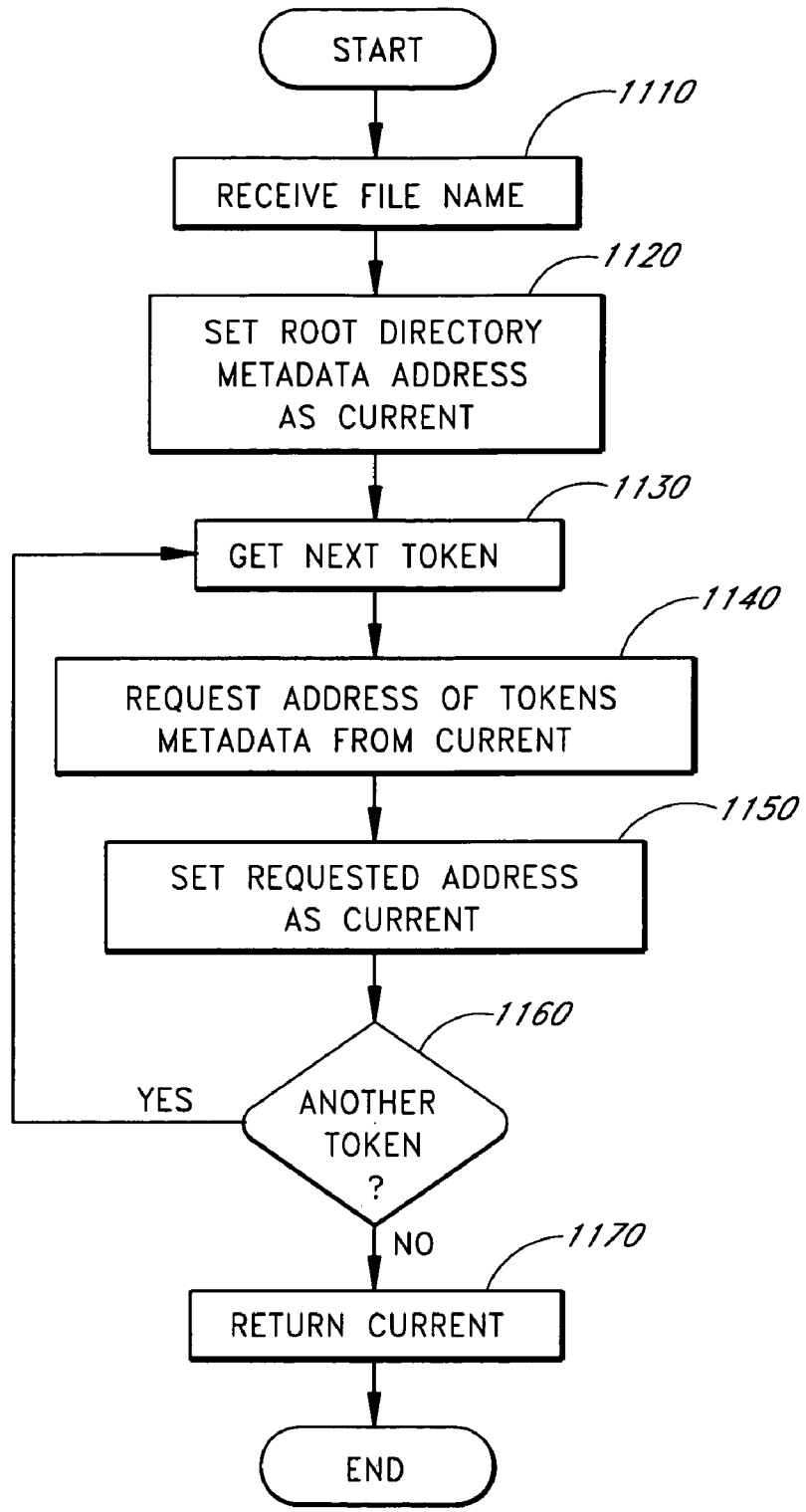
FIG. 11 illustrates one embodiment of a flow chart for performing name resolution.

FIG. 11 illustrates one embodiment of a process for name lookups ("name lookup process"). Beginning at a start state, the name lookup process receives a file name (state 1110), retrieves the root directory's metadata, and sets the location of the root metadata as CURRENT (state 1120). In one embodiment, the root directory's data may be stored in a data structure, such as the data structure of FIG. 5, though it is recognized that a variety of data structures may be used to store the root directory's metadata. Furthermore, in some embodiments, the root directory's metadata may be stored with each smart storage unit 114 such that each smart storage unit 114 has the same or a similar copy of the root directory's metadata. In other embodiments, the root directory's metadata may be stored in other locations in the intelligent distributed file system 110 or sent to the smart storage units 114 with a file request. It is recognized that well known techniques for ensuring the integrity of multiple copies of the data may be used, such as, for example, locking via mutexes and/or semaphores, and so forth.

The name lookup process may then retrieve the next token that is part of the file's name (state 1130). The name lookup process then requests the address of the location of the token's metadata from the smart storage unit 114 which stores the data for CURRENT (state 1140). This request may be local or remote. The name lookup process may then set the returned address as CURRENT (state 1150) and determine whether there is another token (state 1160), where a token represents a single level in a directory hierarchy. If there is another token, the name lookup process returns to block 1130. If there are no more tokens, the name lookup process returns the value of or a reference to CURRENT (state 1170) and proceeds to an end state.

It is recognized that other implementations of a name lookup process may be used. For example, the name lookup process may retrieve the file's metadata data. In addition, once the location of the requested data is found, the name lookup process may determine whether the data is stored locally or with other smart storage units. If the data is stored locally, the name lookup process may send a READ request to the local block manager module 335 of the smart storage unit 114; if the data is stored on another smart storage unit, the name lookup process may send the READ request to the remote block manager module 337 of the remote smart storage unit 114.

C. Processing a File Request

Figure 12:
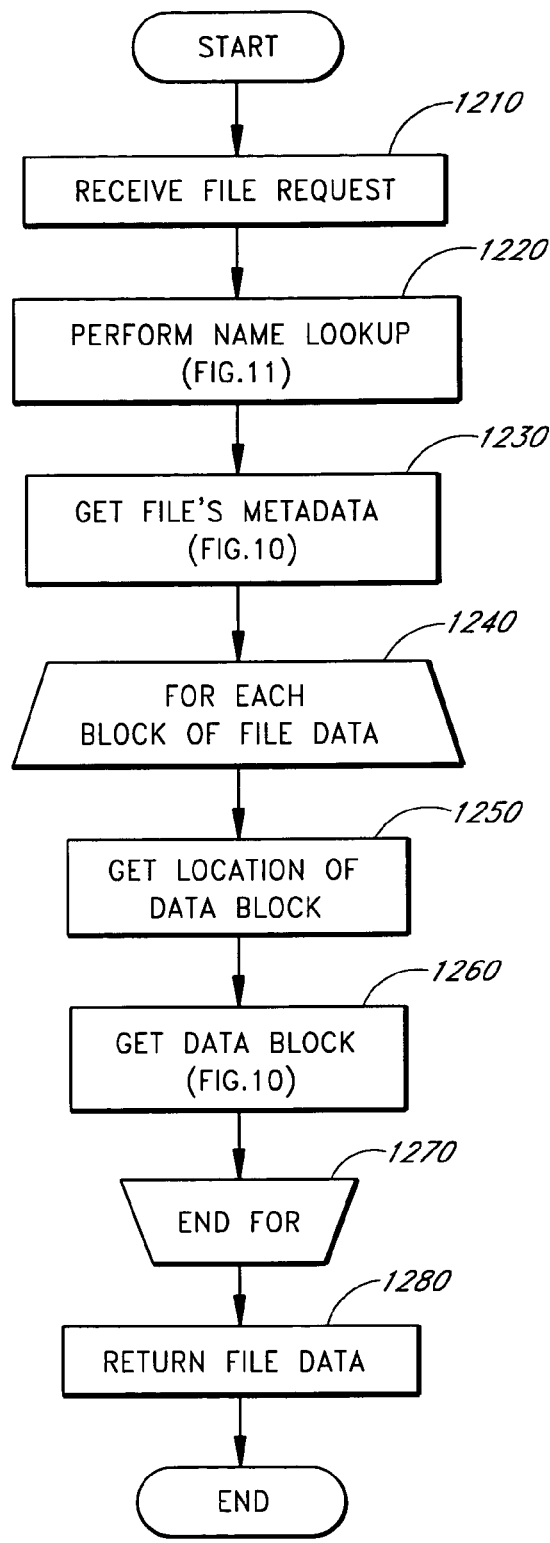
FIG. 12 illustrates one embodiment of a flow chart for retrieving a file.

FIG. 12 illustrates one embodiment of a flow chart for processing a file request ("file request process"). Beginning at a start state, the file request process receives a request to retrieve a file (state 1210). In one embodiment, the file is designated using the file's full path name, including location and file name. In other embodiments, the path may be a relative path and/or other data structures, such as tables, may be used to store information about the file's address. Next, the file request process performs a name lookup process, such as that illustrated in FIG. 11 (state 1220), to determine the location of the file's metadata data structure.

The file request process may then retrieve the file's metadata (state 1230) using a retrieve file process such as that shown in FIG. 10 and discussed above, though other retrieve file processes may be used. In one embodiment, the file's metadata may include a data location table that provides access to the locations in which each block of data in the file is stored throughout the intelligent distributed file system.

Then, for each block of data in the file (states 1240, 1270), the file request process obtains the location of the data block (state 1250) by looking it up in the file's metadata and retrieves the data block (state 1260) using a retrieve file process such as that shown in FIG. 10 and discussed above, though other retrieve file processes may be used.

The file request process then returns the file's data (state 1280) and proceeds to an end state. In some embodiments, the file is returned after the entire set of data has been collected. In other embodiments, one or more blocks of data may be returned as the data is retrieved. The portions may be return in sequential order according to the file location table or they may be returned as they are retrieved or received. In one embodiment, the file request process may put the data blocks in order and/or other modules, such as a streaming server may order the data blocks. After the data has been returned, the retrieve data process proceeds to an end state.

It is recognized that FIG. 12 illustrates one embodiment of a file request process and that other embodiments may be used. For example, the file request process may determine the file's location using a different name lookup process than that shown in FIG. 11. In another example, more than one retrieve data process may be used at the same time to retrieve the data blocks enabling the data to be retrieved by multiple retrieve data processes in parallel using techniques or a combination of techniques, such as, for example, parallel processing, pipelining, or asynchronous I/O.

D. Parity Generation Process

Figure 13:
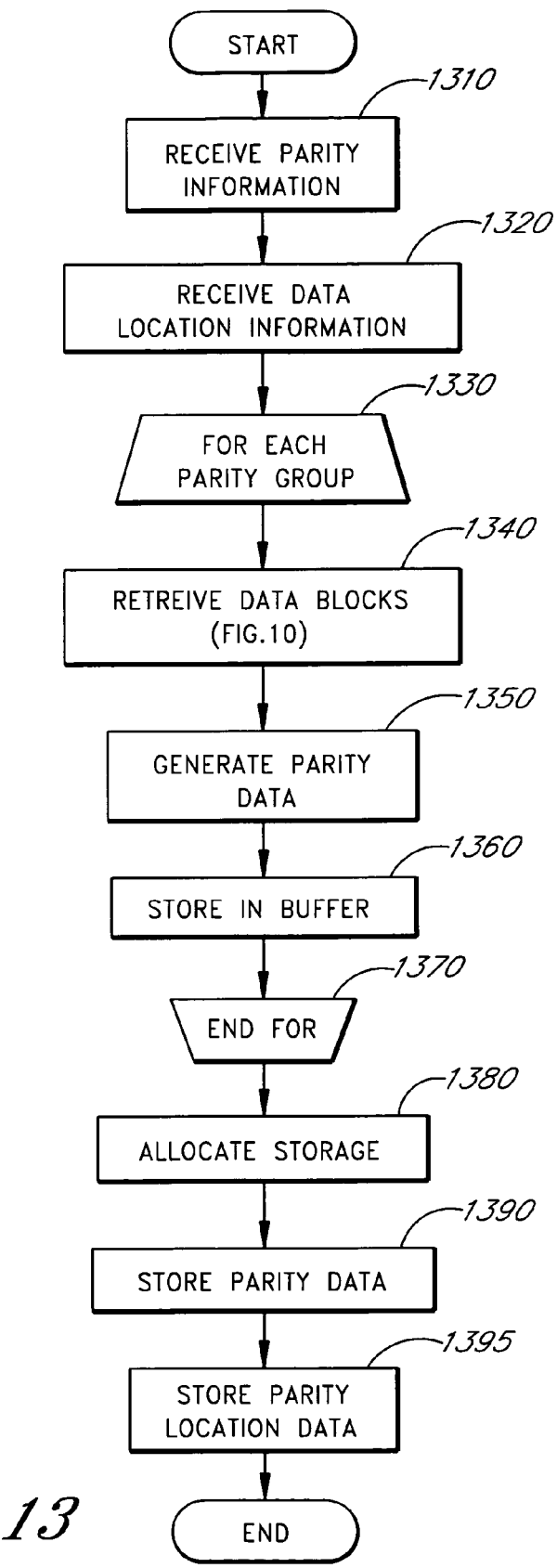
FIG. 13 illustrates one embodiment of a flow chart for creating parity information.

FIG. 13 illustrates one embodiment of a flow chart for generating parity information ("parity generation process"). Beginning at a start state, the parity generation process receives parity scheme information related to a set of data (state 1310). The set of data may represent file data, file metadata, directory metadata, a subset of file data, and so forth. The parity generation process receives data location information related to the set of data (state 1320). Next, for each set of parity data (state 1330, 1370), the parity generation process retrieves a set of data (state 1340). For example, if the parity is 3+1, the parity generation process retrieves the first three blocks of data using a data retrieve process such as that shown in FIG. 10. Next, the parity generation process generates the parity data for the set of data (state 1350), such as, performing an XOR operation of the data on a bit-by-bit, byte-by-byte, or block-by-block basis. The parity generation process may then store the data in a buffer and return to block 1330 until the parity information for the set of data has been generated. After the parity information has been generated, the parity generation process determines where to store the parity data (state 1380). The parity generation process may use a rotating parity scheme, wherein each parity block for each successive strip of file data is stored on the next device in the rotation. The parity generation process allocates the parity block on a different device than any of the devices which are holding data for the current stripe to ensure in the event of a device failure that parity information is not lost at the same time as data information. The parity generation process may also take into account other factors, such as storage capacity, CPU utilization, and network utilization to eliminate some devices from being considered for parity storage. The parity generation process then stores the buffered data in the allocated space (state 1390), records the location of the parity data in a parity map (state 1395), and returns to an end state.

It is recognized that FIG. 13 illustrates one embodiment of a parity generation process and that other embodiments may be used. For example, the parity generation may retrieve blocks of data in parallel and generate parity information in parallel or using well known pipelining or asynchronous I/O techniques. Further, the parity generation process may store the parity information and the location of the parity information without writing to a temporary buffer or the parity generation process may return the parity data or a pointer to the parity data.

E. Data Recovery Process

Figure 14:
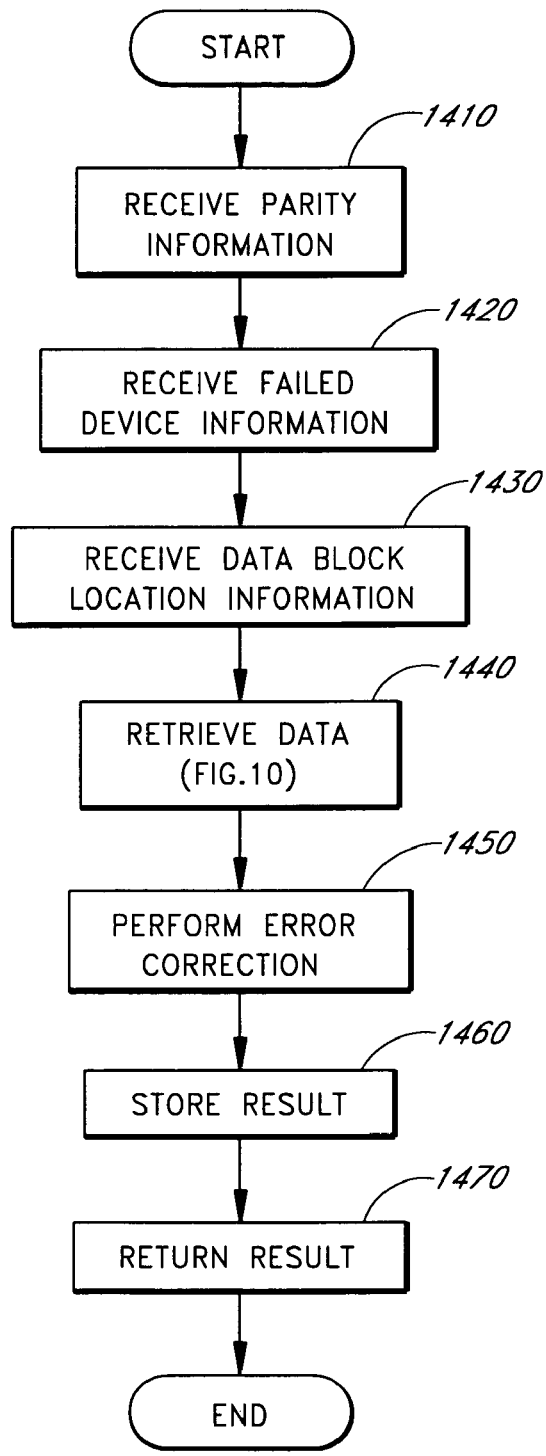
FIG. 14 illustrates one embodiment of a flow chart for performing error correction.

FIG. 14 illustrates one embodiment of a flow chart for recovering lost or corrupt data ("data recovery process"). Beginning at a start state, the data recovery process receives information regarding the parity scheme used (state 1410). The data recovery process then receives information about the failed or corrupt disk or data (state 1420). Next, the data recovery process receives address information for the parity block group in which the missing or corrupt data is assigned (state 1430). The data recovery process then retrieves the data blocks from the available smart storage units (state 1440). The data may be retrieved using a retrieve data process such as that of FIG. 10. The data recovery process performs error correction (state 1450), such as XORing the blocks according to the parity scheme and stores the result in a buffer (state 1460). The data in the buffer represents the missing data. The data recovery process may then return the data in the buffer (state 1470) and proceed to an end state.

It is recognized that FIG. 14 illustrates one embodiment of a data recovery process and that other embodiments may be used. For example, the data recovery process may return the restored data without storing it.

VIII. Restriping of Files in a Distributed File System

In some embodiments, the intelligent distributed file system includes systems and methods for restriping files distributed among a set of smart storage units. Files that have already been distributed and stored on the intelligent distributed file system may be redistributed and restored on the system without interrupting user access to the files and without taking the system off-line. In addition, data may be restriped among the smart storage units with minimal data movement and is typically protected and recoverable even if a system failure occurs during the restriping process.

The restriping process may be used, for example, when one of the smart storage units experiences some type of failure such that the missing data may be regenerated and then restored on the system. The restriping process may also be used when one or more smart storage units are added to or removed from the intelligent distributed file system such that data may be added to the new smart storage units or redistributed to other smart storage units. In addition, the restriping process may be used when the protection scheme of a file is changed. For example, if a file goes from 3+1 parity protection to 4+1 parity protection, the restriping process may move the data to smart storage units in a layout that meets the new parity protection, and until the new layout is complete, continues to allow users access to the file under the old layout such that the data is protected by the old parity scheme.

In one embodiment, the restriping process is performed by the block allocation manager, however, it is recognized that in other embodiments, the restriping process may be performed by other parts of the intelligent distributed file system.

The smart storage units, using the methodologies described above, provide the advantage of not requiring that any specific block of any particular stripe reside at any specific location within the smart storage unit. Thus, the abstraction of a "data stripe" need not relate to any particular set of blocks across multiple smart storage units, but may advantageously contain any available blocks from different units.

A. Restriping Process

Figure 15:
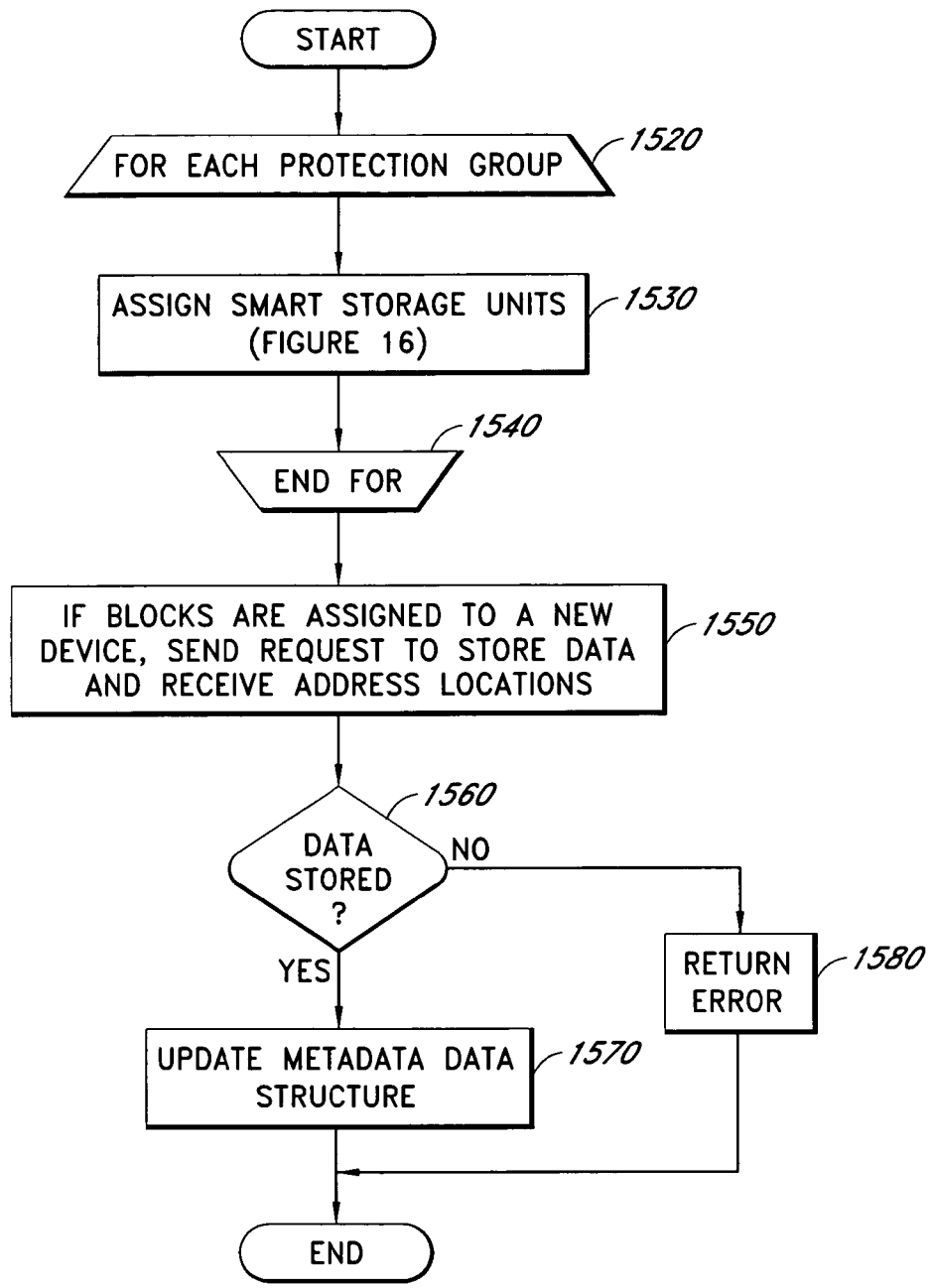
FIG. 15 illustrates one embodiment of flow chart for restriping data in the intelligent distributed file system.

FIG. 15 illustrates one embodiment of a method for restriping data within the intelligent distributed file system ("restriping process"). The file is logically represented as a set of protection groups that are determined based on the file's desired protection scheme. For example, if the file's desired protection scheme is 3+1 parity, the file will be divided into protection groups with four clusters or blocks, namely three content blocks and one parity block. If the file's desired protection scheme is a 3× mirrored protection scheme, the file will be divided into protection groups with three clusters, namely three identical content data blocks.

The restriping process described herein represents an advantageous methodology for moving file data within the system, while not requiring data to reside at any particular location on a smart storage unit. The restriping process also permits data recovery during the restriping process, and permits substantial variation in the striping of data. In addition, particular constraints from the protection scheme are met. For example, parity data and its related content data are each stored on different smart storage units. For mirrored data, each copy of the data is stored on a different smart storage unit.

In one embodiment, the restriping process may advantageously restripe using preferences to allow other objectives when deciding how to store data among the smart storage units.

In one example, the preference is that minimal movement is a priority such that if a block is already located on a smart storage unit, that same smart storage unit is assigned to the block such that the block does not have to be restored on a different smart storage unit. This preference may likely be used when repairing files after a smart storage unit has failed.

Another preference may be that optimal smart storage units are used for the layout. If a block is already located on a smart storage unit and that smart storage unit is one of the "optimal" units, the same smart storage unit is assigned to the block. Thus, some movement of blocks is avoided, but blocks can be moved when necessary to balance the file across a set of smart storage units. Such a preference could be used for example, when protection settings are changed or new smart storage units are added to the intelligent distributed file system.

A further preference may be for optimal layout regardless of where data is already located. Thus, the restriping is done without any regard to the existing location of blocks. Instead, the existing blocks may be moved in order to lay out the file optimally. It is recognized, however, that some data blocks may not need to be moved as they will already be stored on the appropriate smart storage units. In some embodiments, the intelligent distributed file system may want to relocate blocks even if they happen to be present on the optimal smart storage unit in order to repair fragmentation on the storage device. This preference may be used for tuning operations such as, for example, defragmentation or optimization for READ performance, and is likely used on an "as-needed" basis or in the background during normal file system operation.

The goals for an "optimum" layout may be based on one or more factors. For example, the factors may include file size, READ performance, WRITE performance, anticipated access frequency, system throughput, network speed, the available storage device space, and so forth.

In one embodiment, the restriping process attempts to leave a file in a state that permits the file to be recreated using protection data if one or more smart storage units fail during the restriping process. While the preferences may be used if possible, it is recognized that there may be situations in which the preferences may not be met. For example, if Blocks A, B, and C are part of a 3× mirror protection scheme and Blocks A and B are on Device 0 and Block C is on Device 1, either Block A or B will have to be restored on another available smart storage unit to meet the constraints of the protection scheme, even though leaving Block B on Device 0 would satisfy the preference of minimal data movement. When, during the execution of the algorithm, there are periodic instances where the protection scheme constraints and the preference(s) are in conflict with each other, in some embodiments, the system opts to maintain protection with the added expense of extra data movement. It is recognized that in other embodiments, one or more preferences may take priority over the protection scheme depending on the specific implementation.

One embodiment of a restriping process will now be discussed in reference to FIG. 15. Beginning at a start state, the restriping process proceeds to the next state wherein for each protection group, (states 1520, 1540), the restriping process assigns smart storage units to the blocks in the protection group (state 1530). One embodiment of an assignment process is discussed below in reference to FIG. 16, though other assignment processes may be used.

After the blocks are assigned to smart storage units, if the block is assigned to a new smart storage unit (i.e., it is not already stored on the assigned smart storage unit), the restriping process sends a request to the assigned smart storage unit to store the block (state 1550). It is recognized that other embodiments may be used such that the restriping process sends a request to the assigned smart storage units after a set of protection groups have been assigned and that it is not necessary that all of the protection groups are assigned before proceeding to the next state. For example, if the restriping process is used when one or more smart storage units are added to the system, or if one of the smart storage units has failed, the restriping process may send a request to the assigned smart storage units after each protection group is allocated.

Next, the restriping process verifies that the data has been successfully stored (state 1560). In the exemplary embodiment, data that was already stored on the assigned smart storage unit would satisfy this query. If the data was stored successfully, the restriping process updates the metadata data structure related to the file and proceeds to an end state (state 1590). Once the update is complete, the file's new information is used by the system. Any previously used memory is now freed and the metadata reflects the new state of the file.

The metadata update may include, for example, the new address locations of the content blocks, the new address locations of the protection blocks, the new protection scheme, the new list of smart storage units used to store the file's data, and the new list of smart storage units used to store the file's protection information. The restriping process may also update metadata data structures with the new "last block address" for file data and parity data for each smart storage unit. It is recognized that other embodiments may be used such that the restriping process verifies that the data has been successfully stored (state 1560) after a set of protection groups have been stored and that it is not necessary that all of the blocks are stored before proceeding to the next step. In such embodiments, the restriping process may determine the number of protection groups that must be successfully stored before updating the metadata data structure based on the least common multiple of the protection value of the old data and the protection value of the new data. In such instances, the protection value for data that is mirrored is 1 (e.g., for data under a 3× mirrored protection scheme, the protection value would be 1). The protection value for parity protected data is the number of content blocks in each parity group (e.g., for data under a 4+1 parity scheme, the protection value would be 4).

If the data has not been successfully stored (e.g., one or more of the smart storage units were unable to store the data), the restriping process returns an error (state 1580) and proceeds to an end state. Thus, if one or more of the smart storage units are unable to store the data, then the original data is maintained and the file is still protected by its original protection scheme. Any newly stored data is freed.

It is recognized that other embodiments of a restriping process may be used. For example, the allocation process may allocate on a block by block basis such that each metadata data structure is examined and an optimal smart storage unit is recommended based on address and protection settings.

B. Storing Process

In one embodiment, when the assigned smart storage units receive requests to store the data, each assigned smart storage unit determines where the data is to be stored on the storage device. In one example, the assigned smart storage unit attempts to store related data contiguously such that when it receives the new data, the smart storage unit stores the new data in the first available location using the last block address of the file's related data. It is recognized, however, that a variety of storage preferences may be used and that each smart storage unit may use a different set of storage preferences. In other embodiments, all of the smart storage units in the intelligent distributed files system may use the same storage preferences. Once the new data is stored, the smart storage unit returns the address location of the new data. In other embodiments, however, the assigned smart storage unit may directly update the metadata data structure with the data's new address.

C. Assignment Process

Figure 16:
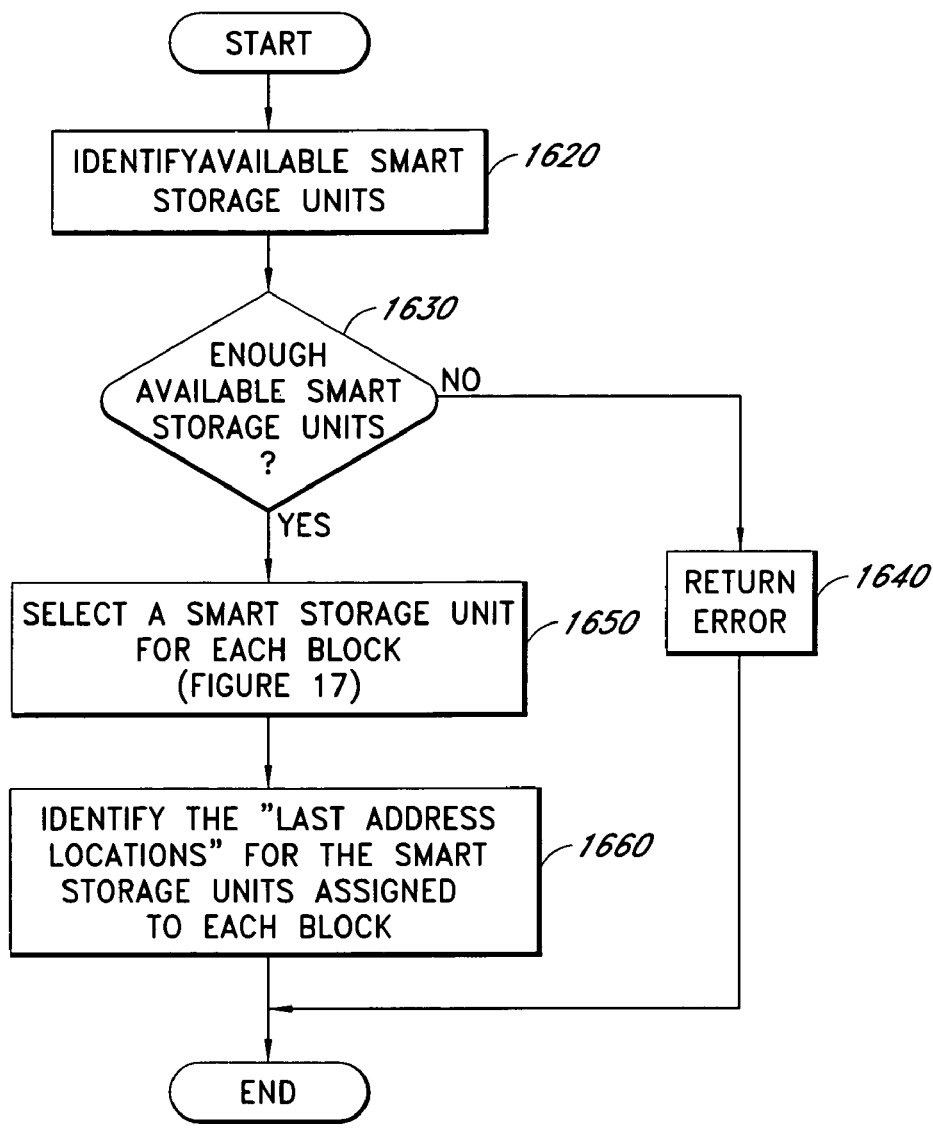
FIG. 16 illustrates one embodiment of a flow chart for assigning data to smart storage units.

FIG. 16 illustrates one embodiment of a method for assigning data blocks and protection blocks to available smart storage units ("assignment process"). The assignment process determines where blocks should be allocated during the restriping process. In the exemplary embodiment, allocation is performed on a single protection group. Thus, allocation is performed for a stripe of data wherein the stripe includes data blocks and any related protection data (e.g., parity data, mirrored copies of the data). The allocation process may attempt to construct a layout that involves the fewest possible block relocations while also determining optimal locations for the blocks and attempting to satisfy any designated layout goals.

Beginning at a start state, the assignment process proceeds to the next state to identify which smart storage units are available (state 1620). In one embodiment, the available units include the smart storage units that are currently used by the file as well as the remaining smart storage units sorted by available free space. It is recognized, however, that in other embodiments, the smart storage units may be ordered differently, or that other data structures may be used to order the available smart storage units (e.g., a rank number may be given to each available smart storage unit). Whether a smart storage unit is "available" may depend on one or more factors such as, for example, whether the smart storage unit is functioning, the throughput rate of the smart storage unit, the amount of free space on the smart storage unit's storage device(s), and so forth.

Next, the assignment process determines whether there are enough available smart storage units to perform the assignment (state 1630). The preferred number of smart storage units may depend upon a variety of factors, such as, for example, the number of data blocks in the protection group, the protection scheme being used, the maximum number of smart storage units in the system, the desired throughput rate of the file, and so forth. For example, a file with 3+1 parity protection requires at least four smart storage units. If there are not enough available smart storage units, then the assignment process returns an error (state 1640) and proceeds to an end state (state 1670).

If there are enough available units, then the assignment process selects a smart storage unit for each block in the protection group (state 1650). A more detailed description of a process for selecting smart storage units is described below in relation to FIG. 17, though other processes may be used.

In some embodiments, after the smart storage units have been selected, then for each selected smart storage unit, the assignment process determines the last location of data blocks related to the current file and/or the last location of protection blocks related to the current data (state 1660) and proceeds to the end state. This allows the new data blocks and/or the new protection blocks to be stored near other data blocks and protection blocks from the file. It is recognized that in other embodiments, other storage preferences may be used. For example, the data may be stored contiguously or non-contiguously, the data may be stored at the end of the storage device rather than at the beginning, and so forth.

D. Selection Process

Figure 17:
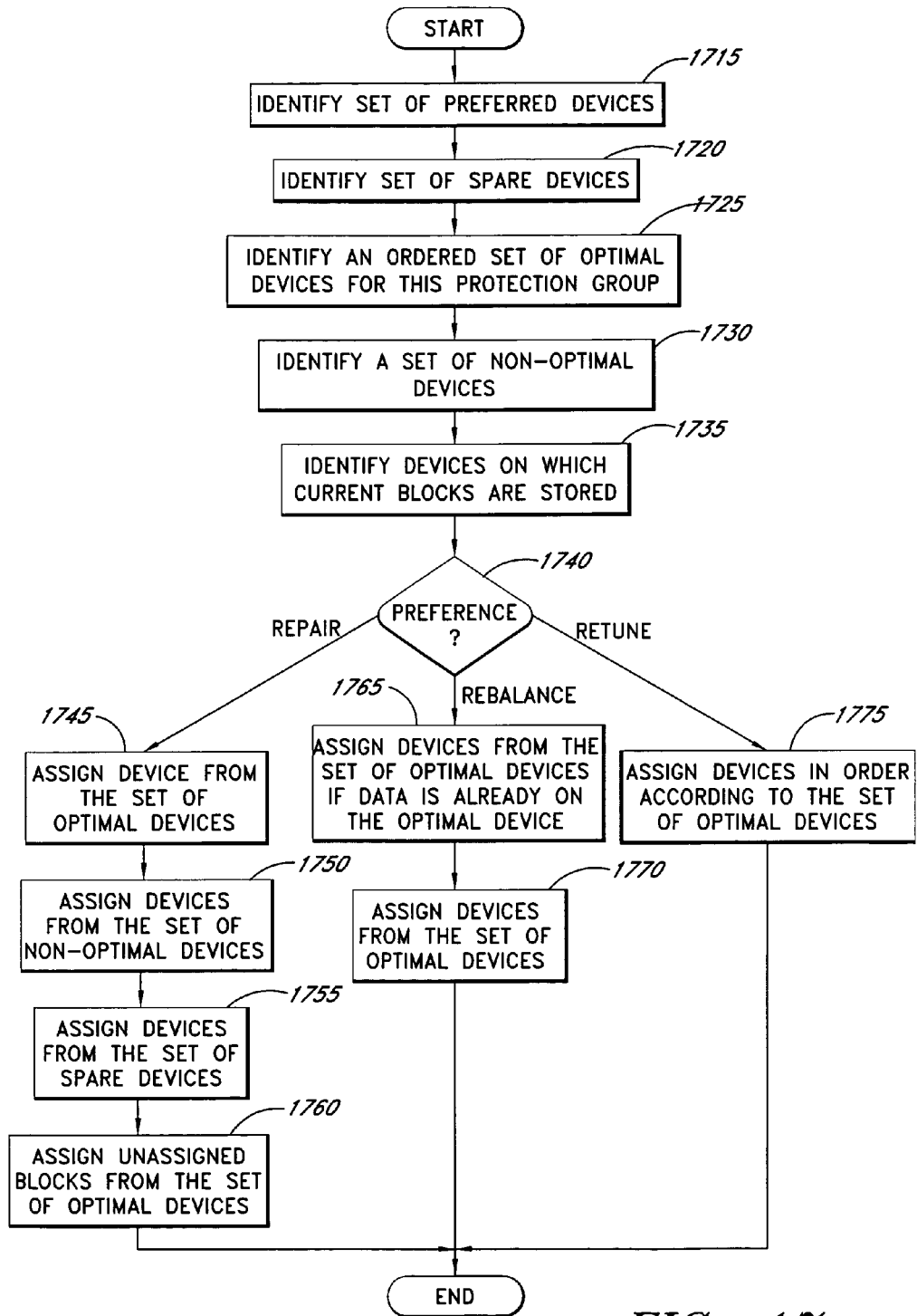
FIG. 17 illustrates one embodiment of a flow chart for selecting among a set of available smart storage units.

FIG. 17 illustrates one embodiment of a method for selecting smart storage units on which to store the clusters of a single protection group ("selection processed"). In the exemplary embodiment, the selection process is used to assign devices to a protection group of a file. As noted above, the protection scheme constraints require that the blocks in the protection group are each stored on a different smart storage unit. Thus, for mirrored files, each copy of the block should be stored on a different smart storage unit, and for parity protected files, each block of content data and its related parity data should be stored on a different smart storage unit. Though the exemplary selection process is used to assign smart storage units to a single protection group, it is recognized that in other embodiments, the selection process may be used to assign smart storage units to smaller and/or larger sets of data. For example, the selection process may work with a single block, on a set of blocks, on a set of protection groups, and so forth.

1. Sample Implementation

The entire set of smart storage units, herein referred to as devices, devices available in the intelligent distributed file system may be represented as T. The set of working devices is a set of all of the running devices in the intelligent distributed file system and may be represented as G. G would exclude any devices in the intelligent distributed file system that were "down" due to some type of failure (e.g., system failure, network failure, storage device failure, etc.). In addition, W represents the set of devices on which the file's content data and protection data is currently stored (i.e., devices that are occupied by the file). It is noted that if the file has never been stored on the intelligent distributed file system, W would be empty.

Beginning in a start state, the selection process proceeds to the next state and identifies a set of the preferred devices (state 1715).

In the exemplary embodiment, the number of devices over which the file may be distributed should be large enough to meet the selected protection scheme constraints. For example, to achieve parity protection of m+n, at least m+n devices are needed. To achieve mirroring of k-times, k devices are needed.

In addition, the number of devices over which the file may be distributed should be small enough such that the file is not made too vulnerable. A file may become vulnerable as it is spread over more and more devices because the likelihood that the file will be affected if a particular device fails is increased. Thus, the system may select an upper limit as the maximum number of devices, max, on which a file's data may be occupied.

Accordingly the constraints on the width of the file may be represented as:

Parity protected using m+n: {m+n}<=width of the file<=max

Mirroring of k-times: {k}<=width of the file<=max

To select the set of preferred devices, P, the system uses the max to set the size of P. The devices from the intersection of G and W are added to P and if P is still not the size of max, then devices from the intersection of G and W! are added to P until P reaches size max. The remaining devices from the intersection of G and W! not added to P are added to S (state 1720).

Thus, if |"max"|==|W & G|, then P will only contain UP devices on which the data already resides and S will only contain UP devices on which data does not already reside. If |"max"|<|W & G|, then P will contain some of the UP devices on which the data already resides, and S will also contain some of the UP devices on which the data already resides as well as some of the UP devices on which data does not already reside. If |"max"|>|W & G|, then P will contain UP devices on which the data already resides and some of the UP devices on which data does not already reside. S will contain some of the UP devices on which data does not already reside.

It is recognized that other methods of selecting preferred devices may also be used.

Next, the selection process identifies an ordered set of optimal devices, that is an "optimal protection group," for the current protection group (state 1725). The optimal protection group may be represented as O. In the exemplary embodiment, the optimal file layout is defined as the layout that would be used if writing the file onto the entire set of preferred devices for the first time. When the final device in P is used, then the next device used is the first device in P allowing the blocks to be "wrapped around" the devices in P. Accordingly, the first block of the first protection group would be stored on the first device in P, the second block of the first protection group would be stored on the second device in P, the third block of the first protection group would be stored on the third device in P, and so forth for the remaining blocks in the first protection group. Then, the first block of the second protection group would be stored on the device on which the last block of the previous protection group was stored, the second block of the second protection group would be stored on the next device, and so forth. While this embodiment allows an overlap of one block in the protection groups among the devices in P, it is recognized that other overlap sizes, including zero, may be used. In this embodiment, the "optimal protection group" can be defined as the ordered set of devices on which a specific protection group would be stored if writing the file onto the preferred devices for the first time. Other definitions for choosing the "optimal file layout" and the "optimal protection group" may be used.

Next, the selection process identifies a set of non-optimal devices, which can be represented as N (state 1730). In this embodiment, N is set the devices within the preferred devices in which the protection group would not be stored if the file was written for the first time.

Next, the selection process creates an array or matrix of the devices on which each of the blocks in the protection group are stored currently (state 1735), which may be referenced as C. C has the same number of columns as there are blocks in the new protection group, and the number of rows in each column corresponds to the number of mirrors used by the file as it is currently stored, with the minimum number of rows being one. The entries in each column in C represent the various devices on which the block is already stored. For example, if a file is currently stored as a 3x file and is being changed to a 5x file, the new protection group is of size five, and the number of mirrors used by the file as it is currently stored is three. Thus, C would have five columns, and each column would have three rows. If a file is currently 3+1 parity protected and is changing to 5+1 parity protection, then C would have six columns, and each column would have one row. If a file has not yet been stored on the system, then C would have a column for each block in the new protection group and would have one row, such that each entry in C would be zero—signifying that none of the blocks are currently stored on the system. A zero entry represents that the block is not currently stored on the system and may also be used, for example, when parity protection is being added to the file, as if parity was not used before, then the parity blocks would not have yet been stored on the system.

The selection process then determines which preference has been selected for this file (state 1740). In the exemplary embodiment, there are three preferences, the first preference ("repair") favors minimizing movement of data by assigning blocks to the smart storage units on which they already reside. The second preference ("rebalance") favors assigning blocks such that blocks that are already reside on a device in the "optimal list" remain on that device, and the other blocks are moved to the remaining devices in the "optimal list." The third preference ("retune") favors assigning all blocks to the ordered values in the "optimal list." It is recognized that the preferences may not always be met if they are in conflict with the selected protection scheme.

It is recognized that the preferences discussed above are exemplary and that a variety of preferences may be used. Furthermore, one or more preferences may be combined to best meet the system's goals. In addition, some embodiments may not use preferences but may only use the constraints of the protection scheme to select the devices. In other embodiments, the preferences may take priority over the protection scheme constraints.

If REPAIR is the preference, then the selection process traverses through each column in C and checks to see if one of the devices in the column matches one of the devices in O (state 1745). If there is a match, then the selection process assigns the matching device to that block such as, by recording the device's ID in the final assignment listing, removes the device from O, and moves to the next column in C. If there is not a match, then the selection process moves to the next column in C. Once each column in C has been traversed, then the selection process proceeds to the next state.

In this state, for every block that has not been assigned, the selection process traverses through the corresponding column in C and checks to see if one of the devices in the column matches one of the devices from N (state 1750). If there is a match, then the selection process assigns the matching device to that block such as, by recording the device's ID in the final assignment, listing removes the device from N, and moves to next block that has not been assigned. If there is not a match, then the selection process moves to the next block that has not been assigned. Once a block that has not been assigned has been traversed, then the selection process proceeds to the next state.

In this state, for every block that has not been assigned, the selection process traverses through the corresponding column in C and checks to see if one of the devices in the column matches one of the devices from S (state 1755). If there is a match, then the selection process assigns the matching device to that block such as, by recording the device's ID in the final assignment listing, removes the device from S, and moves to next block that has not been assigned. If there is not a match, then the selection process moves to the next block that has not been assigned. Once every block that has not been assigned has been traversed, the selection process proceeds to the next state.

In this state, for every block that has still not been assigned, the selection process assigns a device from O (state 1760). Once each block has been assigned, then the selection process proceeds to an end state.

If REBALANCE is the preference, then the selection process traverses through each column in C and checks to see if one of the devices in the column matches one of the devices in O (state 17650). If there is a match, then the selection process assigns the matching device to that block such as, by recording the device's ID in the final assignment listing, removes the device from O, and moves to the next column in C. If there is not a match, then the selection process moves to the next column in C. Once each column in C has been traversed, the selection process proceeds to the next state.

In this state, for every block that has still not been assigned, the selection process assigns a device from O (state 1770) and records the assignment in the final assignment listing. Once each block has been assigned, then the selection process proceeds to the end state.

If RETUNE is the preference, the selection process starts with the first block and assigns the first device in O, the second block is assigned to the second device in O, and so forth such that the devices are assigned using the ordered O list (state 1775). Once each block has been assigned, then the selection process proceeds to the end state.

Thus, the selection process chooses a device for each block in the protection group.

It is recognized that FIG. 17 illustrates one embodiment of a selection process and that other embodiments may be used. For example, the method used to first write out the file may be different. As discussed above, the exemplary embodiment uses a skew to distribute the blocks among the preferred devices and such that the protection groups overlap by one block. In other embodiments, a different skew may be used. In addition, the system could eliminate the use of a skew value. In such case, each protection group could begin its assignment of its data using the same unit each time or after assignment of units to a protection group, the list of preferred units may be reordered based on the various parameters. Furthermore, in other embodiments, the selection process may traverse through each of the sets O, N and S before moving onto the next column in C.

In addition, the set of preferred devices and optimal devices may be selected using additional and/or other criteria. Such criteria may include, for example, which smart storage units are running, the amount of available space on the smart storage unit's storage device, the throughput rate of the smart storage units, the smart storage units in which data from the protection group is already stored, and so forth. It is recognized that different systems may have different goals.

2. Overview of Foundations

The following provides an overview of some of the mathematical constructs discussed above.

a. Operators

The following are the operators used to provide the foundations for the exemplary embodiment discussed with respect to FIG. 17.

&=Intersection
|=Union
!=Inverse
-=Subtraction b. Sets/Lists:

The following are the sets and ordered lists used to provide the foundations for the exemplary embodiment discussed with respect to FIG. 17.

T=set of devices available in the intelligent distributed file system
G=set of all of the running devices in the intelligent distributed file system
w=set of devices that are occupied by the file
S=set of spare devices
P=ordered set of preferred devices
O[size]=optimal assignment of devices to each block in the protection group, where "size" is the size of the protection group
N=non-optimal set=P−O
F[size]=final assignment of devices for each block in the protection group
C[size, k]=current devices assigned to each block, where "k" is the number of mirrors used by the file as it is currently stored

3. Examples

An example selection of devices will now be discussed. It is recognized, however, that the examples are not meant to limit the scope of the invention, but only to provide details about various embodiments.

a. Repair

Suppose that we are trying to repair a 3× file on a four-node array that has just experienced a single device failure on node 3.

W=(1, 2, 3)
G=(1, 2, 4)
dev(X)=3; widthpolicy(X)=8
R=Repair
group_index=0
Here |G|>=dev(X), so we may begin. We have:
P=G & W=(1, 2)
S=G & !W=(4)
Now we append to P, taking from S, such that:
P=(1, 2, 4)
s=( )
The cycle_offset is group_index % |P|, or 0% 3=0. This makes for:
O=(1, 2, 4)
N=( )
Now we iterate over all values in F.
For F[0], C[0] & O is (1, 2), since these two mirrors are possible selections. Both devices 1 and 2 contain mirrors of F[0]. Choose F[0]=1. Delete 1 from O, so that O now is (2, 4).
Now for F[1], C[1] & O is (2). Choose F[1]=2. Delete 2 from O. O is now (4).

For F[2], C[2] & O is the empty set. We now proceed to the final step, assigning the remaining value of O to F[2]. So F[2]=4. Our final F is:

F=(1, 2, 4)

The goal of Repair is accomplished; only one cluster has to be reconstructed. The other two clusters are left in place.

b. Rebalance

Given a 2+1 file on a 3-node array, the Rebalance goal may be used to restripe the file to 3+1 when a fourth node is added to the array.

W==(1, 2, 3)
G==(1, 2, 3, 4)
dev(X)==4; widthpolicy(X)==8
R==Rebalance
group_index=30

Here |G|>=dev(X), so we may proceed. We have:

P=(1, 2, 3)
S=(4)

We append to P, taking from S, such that:

P=(1, 2, 3, 4)
S=( )

The group_index is 30, so the cycle_offset is 30% 4=2. Then:

O=(3, 4, 1, 2)
N=( )

Note that all C[i] have at most a single element, since the file was not mirrored, and therefore there exists only one data copy of each source cluster. For the sake of this example, suppose that:

C=((3), (4), (2), (3))

Thus C[0]=(3), C[1]=(4), etc.

We begin with F[0]. In this case C[i] & O provides 3, so F[0]=3. Similarly, F[1]=4 and F[2]=2. At each step we delete from O, so that O is left containing only (1).

For F[3], C[3] & O is empty. We proceed to the final step of assigning the last member of O to F[3], and thus F[3]=1. Our final F is:

F=(3, 4, 2, 1)

Here two blocks were moved, and all members of F are in O.

C. Retune

The exemplary intelligent distributed file system has 8 devices, A, B, C, D, E, F, G, and H, and the file is comprised of 12 content blocks, b1, b2, b3, b4, b5, b6, b 7, b8, b9, b10, b11, and b12. Currently, the file is stored on devices A, B, C, and D and is mirrored 2 times, but with no parity protection. The following illustrates the devices on which each block of the file is currently stored.

| b1 | b2 | b3 | b4 | b5 | b6 | b7 | b8 | b9 | b10 | b11 | b12 |
|----|----|----|----|----|----|----|----|----|-----|-----|-----|
| A  | B  | C  | D  | A  | B  | C  | D  | A  | B   | C   | D   |
| B  | C  | D  | A  | B  | C  | D  | A  | B  | C   | D   | A   |

If the new data layout includes 3+1 parity protection, but no mirrored data, the file would have four protection groups, each with four blocks—three content blocks, and one parity block. The maximum number of devices on which the file would be distributed, max, is set to four.

Thus:

T={A, B, C, D, E, F, G, H}
W={A, B, C, D}

Next, assume that devices F, G and H are down. This means that:

G={A, B, C, D, E}

To construct P, the devices from the intersection of sets W and G are added to P. If P still does not have the "max" number of devices, devices from the intersection of the sets G and W! are added to P until the "max" number is reached. The remaining devices in the intersection of the sets G and W! are placed in S. In one embodiment, the devices in intersection of G and W! are ordered with those having more free space at the front.

P={A, B, C, D}
S={F}

Using the skew discussed above, the optimal file layout would be:

|                | A   | B   | C   | D   | E   |
|----------------|-----|-----|-----|-----|-----|
| Parity Group 1 | b1  | b2  | b3  | p1  | —   |
| Parity Group 2 | b6  | p2  | —   | b4  | b5  |
| Parity Group 3 | —   | b7  | b8  | b9  | p3  |
| Parity Group 4 | b11 | b12 | p4  | —   | b10 |

Thus, for Parity Group 1:
O={A, B, C, D}
N={E}
C={{A, B}, {B, C}, {C, D}, {0, 0}}
For Parity Group 2:
O={D, E, A, B}
N={C}
C={{D, A}, {A, B}, {B, C}, {0, 0}}
For Parity Group 3:
O={B, C, D, E}
N={A}
C={{C, D}, {D, A}, {A, B}, {0, 0}}
For Parity Group 4:
O={E, A, B, C}
N={D}
C={{B, C}, {C, D}, {D, A}, {0, 0}}

Parity Group 1 is now used as an example for selecting devices using the RETURN preference. Recall that:

O={A, B, C, D}

Thus, the first block in F is assigned to A, the second block in F is assigned to B, the third block in F is assigned to C, and the fourth block in F is assigned to D.

The selection process is called for each of the protection groups resulting in the following assignments.

$F_1$={A, B, C, D}
$F_2$={D, E, A, B}
$F_3$={B, C, D, E}
$F_4$={E, A, B, C}

Thus, the blocks are stored in the same location as they would be in if the file were first being written—the same layout as in the optimal file layout discussed above.

4. Sample Pseudocode

The following provides an example of pseudocode for a sample implementation of the selection process. It is recognized, however, that the example is not meant to limit the scope of the invention, but only to provide details for a specific embodiment.
©2003 ISILON SYSTEMS, INC.
Performing device selection for a protection group

---

& means intersect; | means union; ! means inverse
The algorithm attempts to provide F, a set of device selections for a protection group. All elements of F must be unique. F is an array, indexed as F[i]. For a FEC-protected (parity-protected) file, F describes the devid selections for the set of clusters in the protection group, in order of offset throughout the file. For mirrored files, F describes the devid selections for all the mirrors in the protection group.
The algorithm considers a number of inputs:
    The group_index is the index of the protection group. Every file is divided into a number of disjoint protection groups, which may be assigned indices.
    G is the set of all 'up' devices--i.e. devices that are available and are not experiencing failure conditions.
    W is the set of devices already occupied by the file. It is an ordered list.
    X is a policy that describes how the file is to be laid out. For every X, there is a value dev(X) that indicates the number of devices _required_to protect the file according to X. Note that this is also the number of elements in the protection group, so |F| = dev(X). X also provides a desired _width_ widthpolicy(X) of the file, which is the number of devices that the file _should_ occupy under ideal conditions if |G| >= widthpolicy(X). Note that we require widthpolicy(X) > dev(X).
    C describes the existing layout. It describes for each F[i] the set of devices upon which a copy of the data needed for F[i] may be found, if any. The set of such devices may be delivered as C[i]. |C| == |F|.
    R is the goal of the algorithm. It describes whether the algorithm should:
        R == Repair: Try to minimize block movement when obtaining F.
        R == Rebalance: Try to achieve |W| == widthpolicy(X) while obtaining F.
1. Begin by verifying that G is suitable for the submitted X. If |G| < dev(X), then the algorithm cannot succeed, and return an error to the caller allowing it to retry with a different X.
We wish to establish an ordered array of _preferred_ devices P, from which selections of F may be made. Establish P as a subset of the ordered W as:
    P = G & W
Initially set up a _spare_ array S, as all members of G that are not in w, ordered by their amount of freespace.
    S = G & !W
P and S are both ordered. Now append to P members from S, until |P| == wp:
    while (|P| < widthpolicy(X) and |S| > 0) {
        x = S.pop( ) // take from front
        P.append(x) // add to end
    }
|P| now represents the ideal list of devices for occupation by the file. It should be sized as close to widthpolicy(X) as possible, given G, but of course we may have |G| < widthpolicy(X).
2. Calculate a cycle offset based on the protection group index, to allow rotation of mirrors and parity. Starting at the cycle offset in P, count off devices, and add these into an optimal set O:
    cycle_offset = group_index % |P|
    for (i = 0; i < dev(X); i++)
        O.append(P[(cycle_offset + i) % |P|])
Define N as the less-than-optimal devices:
    N = P − O
Note:
    - N, O and S are disjoint
    - N | O == P
3. Iterate over existing current devids, trying to choose each F[i] so that R is achieved. For R == Repair, we would like to minimize block movement. For R == Rebalance, we would like F to look close to O.
For R == Repair, define an ordered array of selection sets as:
    A = ( O, N, S )
For R == Rebalance, define A simply as:
    A = O
After appropriate selection of A according to R, we can complete F like this:
for SET in A {
    for (i = 0; i < |F|; i++) {
        x = C[i] & SET    // intersect existing devids with desired ones
        if (|x| > 0) {
            y = x.first( )    // get one of these
            SET = SET − y    // prevent it from being reconsidered
            F[i] = y    // put it into F
        }
    }
}
4. We still have to choose devids in F for any F[i] where there was not a suitable selection from C[i], so we complete F as:
for (i = 0; i < |F|; i++) {
    if (F[i] unassigned) {
        F = O.pop( );
    }
}

---

E. Example Pseudocode

The following provides an example of pseudocode for a sample implementation of the restriping process. It is recognized, however, that the example is not meant to limit the scope of the invention, but only to provide details for one embodiment.
©2003 ISILON SYSTEMS, INC.
This section describes the component of the file system that decides how blocks are allocated at the device level (in the BAM). Allocation at the disk and block level is handled by the LBM allocation code. The module described below will be used primarily by the write and restripe components of the BAM to find out where new blocks should be allocated during the writing and restriping process. However, the API may be general enough to be used by other components as needed.
The function lives in bam_layout.c, and is initially used by the new write and restripe code. Other modules such as the DFM may be modified to use it in the future, as needed:

```
int bam_layout_protection_group
    (const struct gmp_group_info *gi,
    long *free_cluster_counts,
    struct inode *ip,
    enum layout_goal_t goal,
    struct protection_level *protection,
    int width_policy,
    ifs_lbn_t start_lbn,
    int num_clusters,
    int curr_devid_depth,
    ifs_devid_t **curr_devids,
    u_int8_t *alloc_counts,
    ifs_devid_t *result_devids,
    ifs_baddr_t *result_pbas);
```

Overview:
This function computes layout information for a single protection group under a specific protection setting. This function is called for a complete protection group (based on the specified protection setting). Layout recommendations will be returned in an out parameter (result_devids), in the form of a single device id for each cluster in the group. Another out parameter (result_pbas) will contain a previous block address for each cluster to be used in allocation.
Parameters:
Gi: Current cluster group info.
free_cluster_counts: Free cluster count for each node in the group. This allows the layout engine to make decisions about which devices to use based upon their current free space. This array should be exactly 'dset_size (&gi->group)' in length.

Ip: The inode. This is primarily used for accessing width_device info and previous block address information.

Goal: A flag that specifies the goal of this layout operation. This flag gives the layout engine a clear objective to refer to when deciding how to layout blocks. There are currently 3 goals:

LAYOUT_REPAIR: This tells the layout engine that the top priority is minimal block movement. The layout engine will assign new devids only where required to maintain our protection constraints (mirrors should be on different devices, etc.). Existing blocks will be moved only when absolutely necessary. This is a goal likely to be used when repairing files after a drive or node failure. Since completely unallocated clusters are still laid out optimally under this scenario, this is a goal likely to be used by the write path (bam_new_write). It is at least as fast in all scenarios as the other two goals, and in many cases *much* faster.

LAYOUT_REBALANCE: This tells the layout engine that optimal devices should be used for the layout. However, those devices can be shuffled to avoid moving existing blocks. In this way, the system avoids moving blocks when possible, but will move blocks when necessary to balance the file across the correct number of nodes. In many cases this will not be as fast as LAYOUT_REPAIR; however, it will result in a more optimal and better balanced file layout. This goal is likely to be used by the restriper when changing protection settings or rebalancing due to new node additions.

LAYOUT_RETUNE—This tells the layout engine that optimal layout is the top priority. No attention will be paid to the location of existing blocks, and any or all existing blocks may be moved to layout the file perfectly. If we are working on a fairly well laid out file, blocks may not need to be moved, since they will already happen to be on the appropriate devices, but no attempt is made to achieve this. In fact, the caller may want to reallocate blocks even if they happen to fall on the optimal device to repair fragmentation in disk. This goal is by far the slowest in most scenarios and will never be faster than LAYOUT_REPAIR or LAYOUT_REBALANCE. Callers likely to choose this goal will be "tuning" operations like defragmentation or optimization for read performance. Those processes will likely run on an "as-needed" basis or in the background during normal file system operation.

Protection: The desired protection setting. This might not be identical- to the protection setting in the inode (for example, if the caller is considering writing a parity file at 2x when parity is not possible). The layout code uses this protection setting when determining where to place blocks. It will ignore the protection settings in the inode itself.

width_policy: The desired width policy for the file. This is the target number of nodes on which the entire file should be laid out. This may not be attainable in many situations, but the layout engine will strive to fulfill this policy.

start_lbn: The first lbn in the region. This will be at the beginning of a protection group since this function requires a whole number of protection groups on which to operate. Start_lbn provides an easy way to calculate skew, allowing us to rotate data and parity information around the cluster. These lbns are also used to identify specific blocks in the results structure.

num_clusters: The total number of clusters in the protection group to be laid out. For example, in a 3+1 protection setting, each protection group contains 4 clusters, while a 3x protection group contains 3 clusters. Num_clusters should agree with the protection parameter exactly. If not, EINVAL will be returned. Note that the num_clusters parameter defines the length of the next three array parameters: curr_devids, alloc_counts, and result_devids.

curr_devids: The devid of the first allocated block in each cluster. This is a 2-dimensional array that should be exactly 'num_clusters' in length. The second dimension allows the caller to supply alternate existing locations for each cluster to be laid out. Please refer to the following 'Curr_devids' section of this document for a more thorough discussion of this parameter. Note that many elements of this array may be set to 0, indicating that no blocks are currently allocated in that particular cluster. The layout engine will attempt to place new blocks where existing blocks are allocated, unless layout constraints prevent it from doing so. Note that the parity cluster(s) should be listed last in this as well as other array parameters.

alloc_counts: For each cluster, the number of blocks the caller intends to allocate. This allows the layout engine to leave fully allocated clusters where they are and move clusters that are partially allocated but cannot be completed on the current device (because that device has since run out of free space). This parameter is only consulted when 1 or more devices nears capacity. This parameter should be exactly 'num_clusters' in length.

result_devids: This out parameter is allocated by the caller and should be exactly 'num_clusters' in length. It contains a recommended devid for each cluster in the protection group. In the future, the layout engine may be extended to recommend specific drives as well. The caller will examine the devid recommended for each cluster. If that devid is not equal to the devids of blocks that are already allocated in that cluster, then those existing blocks are moved to meet layout constraints. New blocks are allocated on the recommended devid. Again, any parity cluster(s) are listed last in this and other array parameters, and mirrors are listed in ascending order.

result_pbas: This out parameter is allocated by the caller and is the size of 'num_clusters' in length. It contains a previous block address (pba) for each cluster, to be sent along with the block allocation request for optimal contiguous allocation. Some of these pbas may be zero if there is no previous data or parity block already allocated on that node. These may also be zero if non-contiguous writing has prevented us from easily finding a previously allocated block on that node. Like the other array parameters, parity cluster(s) are last in this array, and mirrors are listed in ascending order.

Curr_devids Format:

The curr_devids argument mentioned above allows the caller to communicate to the layout engine information about the locations of currently allocated blocks in the protection group. The layout engine will consult this information and attempt to move as few blocks as possible while still fulfilling the requested 'goal'.

Like the other array parameters, the curr_devids array are the size of 'num_clusters' in length (the size of exactly 1 protection group). In the case of parity, the parity cluster(s) are listed last in the protection group, and mirrors are listed in ascending mirror index order.

What makes this parameter different from the other arrays is that this is a 2-dimensional array. The array will contain 1 column of devids for each cluster in the new protection group (it is 'num_clusters' in length). Each column contains the mirrors of the existing data block (therefore, the number of rows in this array will almost always be equal to the data mirror count of the old layout). In this way, the caller can tell the layout engine that an existing cluster has mirrors on devices A, B, and C. The layout engine then knows that if it chooses A, B, or C for that cluster, the caller will likely not have to move any currently allocated blocks.

A few examples will make this more clear. Suppose that the system is restriping a file from 3× to 3+1. The system asks the layout engine to layout 1 3+1 protection group (containing the first 3 clusters of data in the file). The system constructs the curr_devids array by allocating an array with 4 columns and 3 rows. 4 columns because the new protection group will have 4 clusters, and 3 rows because each existing block has 3 mirrors:

curr_devids[4] [3]:

[1] [2] [3] [0]
[2] [3] [4] [0]
[3] [4] [5] [0]

Note that the 4th column is empty because no parity blocks are currently allocated, but each data cluster has 3 existing mirrors. This tells the layout engine everything it needs to know about the current file layout.

Another example. Suppose the system is restriping a file from 3+1 protection to 3× protection. The system is going to create a curr_devids list which is 3 clusters in length (since our new 3× protection group will have 3 clusters), and 1 cluster deep (since the old data is not mirrored):

curr_devids[3] [1]:

[1] [2] [3]

This illustrates the fact that extra rows are only needed if current clusters are mirrored, and the system wants to tell the layout engine where the existing mirrors are located. As previously stated, the 2nd dimension is almost always going to be set to the old data mirror count of the file. If the old file is parity protection, this will be 1.

The real power of this structure reveals itself when restriping from one mirroring setting to another. For example, suppose the system is restriping a file from 5x to 2x. The system will create a curr_devids array which has a length of 2 (since our new protection group will contain 2 clusters), and a depth of 5 (since each existing data cluster has 5 mirrors). The layout engine needs to know the locations of existing mirrors so it can choose the best 2 to keep:

curr_devids[2] [5]:

[1] [1]
[2] [2]
[3] [3]
[4] [4]
[5] [5]

Note that in this case some of the information is redundant, because the system is only talking about 1 data cluster (which is mirrored 5 times). However, this structure is easy for the layout engine to understand. All the engine cares about is the fact that it can choose any member of the first column for the first mirror, and any member of the second column for the second mirror, and the resulting layout will require no data block movement at all. This format gives the layout engine the information that it needs to make efficient layout decisions.

Most of the time, when writing normal files, this array will be very simple. The extra complexity is only needed when restriping, or performing recovered writes when devices are unavailable. For example, if writing the 3rd cluster in a 3+1 file, the curr_devids array will simply be:

curr_devids[4] [1]:

[1] [2] [0] [4]

Likewise, if writing the 3rd cluster of a 3x file, the array can simply be:

curr_devids[3] [1]:

[1] [2] [0]

In these cases, the existing protection setting is exactly the same as the new setting, so the system can communicate the existing layout information in a flat array.

Return Values:
 0: Success. The out parameter contains device IDs for blocks which need to be allocated or moved, and no results for blocks which need not be moved. Every cluster which requires allocation will have an associated previous block address (pba) for use in the actual allocation call.
 EROFS: There aren't enough available devices to layout the requested blocks without violating layout constraints. The caller can either return this error to their caller, or call bam_layout_protection_group( ) with another desired protection setting.
 EINVAL: Invalid parameter. For example, if the 'num_clusters' specified is not equal to exactly one complete protection group, this error will be returned. In debug builds, it will also be accompanied by an assertion failure in the layout module, to help track down the bad caller. This error code is not expected in normal operation, and is indicative of a coding error.

Pseudocode:
 This document describes the basic implementation of the BAM-level Layout module.
 Phase 1: Based on the group info, width requirements, and per-device free-block statistics, a list of available devices with enough free space to use is formed. Cases where the system is out of space or too many devices are down to write at the desired protection level will be caught here, and errors will be returned to the caller.
 Phase 2: A different devid is assigned from the list of devices to each cluster in the protection group. If there are already blocks allocated on a specific device, the system attempts to assign devids such that existing blocks do not need to be moved. This may or may not be possible depending on the existing block layout and the currently available devices. Note that the goal parameter will play a large part here. If the goal is LAYOUT_REPAIR, every attempt will be made to avoid moving blocks. If the goal is LAYOUT_REBALANCE, the system attempts to avoid moving blocks, but will do so if needed to balance the file properly. Finally, if the goal is LAYOUT_RETUNE, optimal layout will be computed, regardless of where existing blocks live.

Phase 3: Having assigned a devid to every cluster, the systems assigns a pba to each cluster for allocation purposes. This is done by looking at the pba lists in the struct inode that gives the block addresses of the last block allocated on each device. The system grabs the correct one for each cluster and is done. The only subtlety here is that the system wants data blocks to use data pbas and parity blocks to use parity pbas. They are stored separately in the struct inode, so the correct list should be consulted.

Issues:

1) Out of disk space: One outstanding question with this algorithm is what to do when some or all nodes near capacity. If possible, the system would like to avoid recommending devices to the caller that will result in ENOSPC errors on allocation. Those errors will not trigger a syscall restart if no array state has changed, and will therefore be propagated all the way back to the user. This issue is best handled in Phase 2, when we are actually assigning devids to the result list. At that time, we can check the available disk space on that device (remembering to account for reserved space which we can't access). Here is how that information affects each scenario:

LAYOUT_RETUNE: No change in behavior. This scenario prefers optimal layout no matter what. If the system gives less than optimal layout, chances are it is no better than what is already available.

LAYOUT_REPAIR/LAYOUT_REBALANCE: If the systems is assigning a devid that matches the current_devid passed in, the system does not need to worry about free space. The system has already allocated blocks allocated there, so the system either will not be moving any of them, or will only be allocating a few. The system wants to move as few blocks as possible in these scenarios, so leave those devids as they are.

When the system is about to assign a devid to an empty slot (meaning there is no current_devid for that cluster), look at the free space for that device. If it's near full, attempt to find another preferred device that has more free space, and use that instead. If all of the preferred devices are near full, assign the device that has the greatest amount of free space out of both the preferred and spare device lists.

Note that ENOSPC is not returned from the layout engine API. Free space information is a little out-of-date, since it takes some time to retrieve those counts from remote devices. When space is tight, the system recommends the most promising devices based on the existing counts. At worst, the caller will get an ENOSPC when allocation is attempted.

Algorithm Pseudocode:

```
int
bam_layout_protection_group(gi, free_clusters, ip, goal, protection,
    width_policy, start_lbn, num_clusters, curr_devid_depth,
    curr_devids, alloc_counts, *result_devids, *result_pbas)
{
    /* Get current width device list from dinode. */
    /* Remove n DOWN devices from the list. */
    /* Compute max_width (MAX_WIDTH – n). */
    /* Add all remaining UP devices to the list. */
    while (width device list size < UP device list size) {
        /* Add UP device with most free clusters. */
    }
    /*
     * Truncate the list to max_width in length. This prevents us
     * from overflowing the dinode width device limit.
     */
    /*
     * Calculate preferred_width and min_width, using width_policy
     * and the desired protection parameter.
     */
    /* Verify that we have enough available devices. */
    if (not)
        return EROFS;
    /*
     * At this point, we have a list of all of the online devices we
     * could possibly use. At the beginning of the list are devices
     * currently used by this file, followed by all remaining devices
     * sorted by available free space.
     */
    /*
     * Split the list into 2 parts. The first sublist will be exactly
     * preferred_width in length starting at the beginning of our master
     * list. The second sublist contains the rest of the master list. We
     * will call the first list our 'preferred_devices', and the second
     * list our 'spare_devices'. The second list may be empty.
     */
    /* Now, begin laying out the protection group. */
    /* Sanity check num_clusters and alloc_counts. */
    If (insane)
        /*
         * We need a whole number of protection groups,
         * and alloc_counts should be between 0 and 16.
         */
        return EINVAL;
    /* Calculate start_lbn (first lbn in protection group). */
    /* Calculate a group_number using start_lbn. */
    /* Clear elements of current_devids which are DOWN. */
    /* Clear duplicate devices in current_devids. */
    /*
     * Calculate a start_offset in the preferred_device list
     * (probably just (group_number % list size)). This will
     * take care of skew.
     */
    /*
     * Starting at start_offset in the preferred_list, step
     * through the list for each cluster we are assigning, and
     * copy each devid to a new list (wrapping around to the
     * beginning of the preferred list if necessary). This new
     * sublist will be called the optimal_device list.
     */
    /* Assign devids based on the caller-specified goal. */
    switch (goal) {
        case LAYOUT_REPAIR:
            /* Avoid block movement. */
            error = bam_layout_repair( );
            break;
        case LAYOUT_REBALANCE:
            /* Ensure balanced layout. */
            error = bam_layout_rebalance( );
            break;
        case LAYOUT_RETUNE:
            /* Optimal layout. */
            error = bam_layout_retune( );
            break;
        default:
            ASSERT(0);
    };
    /*
     * Almost Done! Every cluster should now be assigned a devid.
     */
    /* Now we just have to choose previous block addresses... */
    for (each cluster in the protection group) {
        /* Initialize pba to zero_baddr. */
        /* Determine if this is a parity or data cluster. */
        /* Grab the proper pba list from the struct inode. */
        /* Search for a useable pba. */
        for (each item in the pba list) {
            /*
             * If the devid matches our recommended devid
             * for this cluster, use this pba, and break.
             */
        }
    }
    /* Now we're really done! */
}
int
bam_layout_repair( )
{
    /* Assign existing devids wherever possible. */
    /* Fill empty slots with devids from the optimal list. */
```

```
}
int
barn_layout_rebalance( )
{
    /* Zero existing devids that aren't present in the optimal list. */
    /*
     * Reshuffle optimal list if necessary to minimize movement of
     * existing blocks, and assign to output.
     */
}
int
barn_layout_retune( )
{
    /* Assign optimal list to output, no questions asked. */
}
```

IX. Copyright Information

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

X. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A distributed file storage system comprising:
   multiple storage units configured to communicate with each other, each storage unit comprising a storage device, a processor, and at least one executable software module stored on the storage unit, the processor configured to execute the at least one executable software module;
   a first file stored on the distributed file system in a first set of a plurality of stripes, the first file comprising multiple data blocks, each of the first set of a plurality of stripes comprising a subset of the multiple data blocks, wherein at least a first one of the multiple data blocks is stored on a first one of the multiple storage units and at least a second one of the multiple data blocks is stored on a second one of the multiple storage units;
   error correction data related to the first file stored on the distributed file system wherein the error correction data is configured to be used in conjunction with available data blocks to reconstruct the first file;
   a first metadata block associated with the first file stored on a third one of the multiple storage units, the first metadata block comprising an address location of each of the multiple data blocks of a stripe stored on the distributed file system and at least one address location of error correction data stored on the distributed file system;
   a second file stored on the distributed file system in a second set of a plurality of stripes;
   a second metadata block associated with the second file stored on a fourth one of the multiple storage units which is different than the third one of the multiple storage units, wherein the second metadata block is different than the first metadata block;
   wherein the at least one executable software module of each storage unit is configured to:
   access one or more metadata blocks stored on one or more different storage units;
   restripe, according to one or more preferences, at least a portion of the first file among two or more of the multiple storage units, wherein the one or more preferences comprise one or more of the following: minimizing movement of data, distributing the at least a portion of the first file or at least a portion of the error correction data among two or more of an optimal or preferred subset of the multiple storage units, distributing the at least a portion of the first file or at least a portion of the error correction data among two or more of an optimal or preferred ordered subset of the multiple storage units, or distributing the at least a portion of the first file or at least a portion of the error correction data based on one or more performance metrics;
   restripe, according to the one or more preferences, at least a portion of the error correction data among two or more of the multiple storage units; and
   update the first metadata block to include a new address location for each of the multiple data blocks that was restriped and a new address location for each of the error correction data that was restriped, wherein the new address location includes data locations on different storage units.

2. The distributed file system of claim 1 wherein the software module is further configured to minimize movement of data during restriping.

3. The distributed file system of claim 1 wherein the software module is further configured to initiate restriping in response to a predetermined change in the distributed file system.

4. The distributed file system of claim 3 wherein the predetermined change includes an indication to change the first file's protection scheme from a first protection scheme to a second, different protection scheme.

5. The distributed file system of claim 3 wherein the predetermined change includes an indication to add one or more additional storage units.

6. The distributed file system of claim 3 wherein the predetermined change includes an indication to respond to one or more failed storage units.

7. The distributed file system of claim 3 wherein the predetermined change includes an indication to remove one or more existing storage units.

8. The distributed file system of claim 1 wherein an address location comprises at least an indication of a storage unit on which the data is stored and a memory block address.

9. The distributed file system of claim 1 wherein the error correction data includes at least one of parity data blocks and mirrored data blocks.

10. The distributed file system of claim 1 wherein each of the storage units is configured to store data and respond to and implement read requests on behalf of the distributed file system.

11. The distributed file system of claim 1 wherein one of the storage units is configured to store data and another one of the storage devices is configured to respond to and implement read requests on behalf of the distributed file system.

12. The distributed file system of claim 1 wherein the first, second, and third storage units are different storage units.

13. A distributed file storage system comprising:

multiple storage units configured to communicate with each other, each storage unit comprising a storage device, a processor, and at least one executable software module;

a first data file stored on the distributed file system in multiple stripes, the first data file comprising multiple data blocks, each of the multiple stripes comprising a subset of the multiple data blocks, wherein the multiple data blocks are distributed among a subset of two or more said multiple storage units;

error correction data related to the first data file comprising multiple error correction blocks, the multiple error correction blocks distributed among a subset of two or more said multiple storage units;

a first metadata associated with the first data file, the first metadata stored on at least one of the multiple storage units and comprising locations of each of said multiple data blocks of each stripe of the first data file and locations of each of said multiple error correction blocks; and a second metadata associated with a second data file, wherein the second metadata is different than the first metadata;

wherein the location of the first metadata is not dependent on the locations of each of said multiple data blocks, the locations of each of said multiple error correction blocks, or the location of the second metadata; and wherein said at least one executable software module of each storage unit is configured to:

access metadata stored on a different storage unit;

reconstruct at least a subset of said multiple data blocks using at least a subset of said multiple error correction blocks and a subset of said multiple data blocks;

redistribute at least a subset of said multiple data blocks among a subset of two or more said multiple storage units based on one or more preferences, wherein the one or more preferences comprise one or more of the following: minimizing movement of data, distributing the at least a portion of the first file or at least a portion of the error correction data among two or more of an optimal or preferred subset of the multiple storage units, distributing the at least a portion of the first file or at least a portion of the error correction data among two or more of an optimal or preferred ordered subset of the multiple storage units, or distributing the at least a portion of the first file or at least a portion of the error correction data based on one or more performance metrics;

redistribute at least a subset of said multiple error correction blocks among a subset of two or more said multiple storage units based on the one or more preferences;

update the first metadata to include a new location for one or more of said multiple data blocks; and update the first metadata to include a new location for one or more of said multiple error correction blocks.

* * * * *